United States Patent
Young

(10) Patent No.: US 9,875,398 B1
(45) Date of Patent: Jan. 23, 2018

(54) SYSTEM AND METHOD FOR FACE RECOGNITION WITH TWO-DIMENSIONAL SENSING MODALITY

(71) Applicant: Shiqiong Susan Young, Bethesda, MD (US)

(72) Inventor: Shiqiong Susan Young, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/198,344

(22) Filed: Jun. 30, 2016

(51) Int. Cl.
*G06K 9/00* (2006.01)
*G06F 17/30* (2006.01)

(52) U.S. Cl.
CPC ... *G06K 9/00288* (2013.01); *G06F 17/30256* (2013.01); *G06K 9/00248* (2013.01); *G06K 9/00255* (2013.01); *G06K 9/00281* (2013.01)

(58) Field of Classification Search
CPC .......... G06K 9/00288; G06K 9/00248; G06K 9/00255; G06K 9/00281; G06K 9/00228; G06K 9/00295; G06K 9/00617; G06F 17/30256; G06T 7/68; G06T 7/74
See application file for complete search history.

(56) References Cited

U.S. PATENT DOCUMENTS

| | | | |
|---|---|---|---|
| 7,127,087 B2 | 10/2006 | Huang | |
| 7,142,697 B2 | 11/2006 | Huang et al. | |
| 7,221,809 B2 | 5/2007 | Geng | |
| 7,295,687 B2 | 11/2007 | Kee et al. | |
| 7,406,184 B2 | 7/2008 | Wolf | |
| 7,421,097 B2 * | 9/2008 | Hamza | G06K 9/00288 235/382 |

(Continued)

FOREIGN PATENT DOCUMENTS

| | | |
|---|---|---|
| EM | 1811456 | 11/2004 |
| EP | 1872303 B1 | 5/2010 |

OTHER PUBLICATIONS

C. S. Martin et. al., "Recent advances on face recognition using thermal infrared images," Reviews, Refinements and New Ideas in Face Recognition, InTech Open Access Publisher, edited by Peter M. Corcoran, Chapter 5, pp. 95-112, Jul. 201.

(Continued)

*Primary Examiner* — Ali Bayat
(74) *Attorney, Agent, or Firm* — Lawrence E. Anderson

(57) ABSTRACT

A method and system in which facial image representations stored in a database are defined by facial coordinates in a plane common to other images in the database in order to facilitate comparison or likeness of the facial images by comparing the common plane facial coordinates, the common plane being determined by the locations of the eyes and mouth corners; at least one input operatively connected to the at least one processor and configured to input the corners of the eyes and mouth coordinates; the at least one processor configured to convert inputted coordinates for the corners of the eyes and mouth into estimated common plane coordinates by minimizing the error between the inputted corners of the eyes and mouth coordinates and the estimated coordinates corners of the eyes and mouth obtained from the least square estimation model of the common plane coordinates of the corners of eyes and mouth.

17 Claims, 24 Drawing Sheets

(56) References Cited

U.S. PATENT DOCUMENTS

| | | | |
|---|---|---|---|
| 7,512,255 B2 | 3/2009 | Kakadiaris | |
| 7,542,592 B2 | 6/2009 | Singh et al. | |
| 7,555,148 B1 | 6/2009 | Steinberg et al. | |
| 8,055,028 B2 | 11/2011 | Park et al. | |
| 8,379,014 B2 | 2/2013 | Wiedemann et al. | |
| 8,538,044 B2 * | 9/2013 | Tsukizawa | A61B 3/113 381/117 |
| 8,675,926 B2 * | 3/2014 | Zhang | G06K 9/00906 382/118 |
| 8,712,109 B2 * | 4/2014 | Hua | G06K 9/00281 382/118 |
| 8,830,164 B2 * | 9/2014 | Sakata | G06F 3/013 345/156 |
| 9,619,723 B1 * | 4/2017 | Chow | G06K 9/00906 |
| 2003/0063795 A1 | 4/2003 | Trajkovic et al. | |
| 2005/0286767 A1 | 12/2005 | Hager et al. | |
| 2006/0120571 A1 | 6/2006 | Tu et al. | |
| 2007/0189584 A1 * | 8/2007 | Li | G06K 9/00295 382/118 |
| 2010/0149177 A1 | 6/2010 | Miller | |
| 2010/0284577 A1 | 11/2010 | Hua et al. | |
| 2011/0293189 A1 | 12/2011 | Sun et al. | |
| 2012/0230545 A1 | 9/2012 | Zhang et al. | |
| 2012/0288167 A1 | 11/2012 | Sun et al. | |
| 2012/0308124 A1 | 12/2012 | Belhumeur et al. | |
| 2013/0010095 A1 | 1/2013 | Aoki et al. | |

OTHER PUBLICATIONS

M. K. Bhowmik, et. al., "Thermal infrared face recognition—a biometric identification technique for robust security system," Reviews, Refinements and New Ideas in Face Recognition, InTech Open Acess Publisher, edited by Peter M. Corcoran, Chapter 6, pp. 114-138, Jul. 2011.

P. Viola and M. Jones, "Robust real-time object detection," Second International Workshop on Statistical and Computational Theories of Vision—Modeling, Learning, Computing, and Sampling, pp. 1-25, Vancouver, Canada, Jul. 13, 2001).

S. S Young, "Optimized target localization in stereotactic radiosurgery using real-time digital portal images," Phys. Med. Biol. vol. 41, pp. 1621-1632, (1996).

Jain, a.K., et al., "An introduction to biometric recognition," IEEE Trans. on Circuits and Systems for Video Technology, vol. 14, No. 1, pp. 4-20, Jan. 2004.

Zhao, W., et al., "Face recognition: a literature survey," ACM Computing Surveys, vol. 35, No. 4, pp. 399-458, Dec. 2003.

Kong, S.G., et al., "Recent advances in visual and infrared face recognition—a review," Computer Vision and Image Understanding, vol. 97, pp. 103-135, (2005).

Martin, C.S., et. al., "Recent advances on face recognition using thermal infrared images," Reviews, Refinements and New Ideas in Face Recognition, InTech Open Acess Publisher, edited by Peter M. Corcoran, Chapter 5, pp. 95-112, Jul. 2011.

Bhowmik, M. K., et. al., "Thermal infrared face recognition—a biometric identification technique for robust security system," Reviews, Refinements and New Ideas in Face Recognition, InTech Open Acess Publisher, edited by Peter M. Corcoran, Chapter 6, pp. 114-138, Jul. 2011.

Wolff, L. B., et al., "Face recognition in the thermal infrared," Computer Vision Beyond the Visible Spectrum Book, pp. 167-191, Springer London, 2006.

Klare, B.F., et al., "Heterogeneous face recognition using kernel prototypes similarities," IEEE Transactions on Pattern Analysis and Machine Intelligence (PAMI), vol. 35, No. 6, pp. 1410-1421, Jun. 2013.

T. Bourlai, T., et al., "A study of using mid-wave infrared images for face recognition," SPIE vol. 8371, 83711k, Apr. 2012.

Choi, J., et al., "Thermal to visible face recognition," SPIE vol. 8371, 8371B, Apr. 2012).

Murphy-Chutorian, E., et al, "Head pose estimation in computer vision: a survey," IEEE Transactions on Pattern Analysis and Machine Intelligence (PAMI), vol. 31, No. 4, pp. 607-626, Apr. 2009.

Abate, A.F., et al., "2D and 3D face recognition: A survey," Pattern Recognition Letters, vol. 28 pp. 1885-1906, 2007.

X. Zhang, Y. Gao, "Face recognition across pose: A review,", Pattern Recognition, vol. 42, pp. 2876-2896, 2009.

Intel Perceptual Computing SDK "How to Use the Face Detection Module," Oct. 30, 2012.

* cited by examiner

PROBLEM: Pictures of subjects (suspects) are taken with faces not pointed directly at the camera so face images may contain yaw (pose rotation left and right), pitch (head tilt rotation (up and down)), and roll (in plane rotation). Detection may fail if the database contains an image which is not in the correct pose. Also, pictures of subject taken by a different modality (regular camera versus thermal image);

OBJECTIVE: Incorporate yaw, pitch roll into Unified Coordinate System (UCS)

Unified Coordinate System (UCS) includes yaw (pivot left or right movement), pitch (pivot up or down movement) and roll (pivot sideways movement) of the subject's head and defines by measurements the location of the two eyes (inner and outer points) and mouth (left and right sides) to characterize the image. Optionally, visible to thermal cross modality facial image recognition may be provided.

Development of vector ($V_P$) set of ten parameters $V_P$ which incorporates yaw ($\theta$), pitch ($\phi$), roll ($\psi$) into Unified Coordinate System (UCS)

$$V_P = (x_{e1}, y_{e1}, x_{e2}, y_{e2}, x_m, y_m, \theta, \phi, \psi, a)$$

Where $x_{e1}, y_{e1}, x_{e2}, y_{e2}, x_m, y_m$ are the new parameters which are independent of yaw, pitch, and roll, and where $\theta$, $\phi$, $\psi$, and $\alpha$ are used in a Gaussian Least Squares Differential correction (GLSDC) minimization procedure to perform the conversion.

FIG. 1

For P1's v value, the equation is:
$$v = \alpha \begin{bmatrix} 0 & 1 & 0 \end{bmatrix} \begin{bmatrix} \cos\theta & \sin\theta & 0 \\ -\sin\theta & \cos\theta & 0 \\ 0 & 0 & 1 \end{bmatrix} \begin{bmatrix} \cos\phi & 0 & \sin\phi \\ 0 & 1 & 0 \\ -\sin\phi & 0 & \cos\phi \end{bmatrix} \begin{bmatrix} 1 & 0 & 0 \\ 0 & \cos\psi & \sin\psi \\ 0 & -\sin\psi & \cos\psi \end{bmatrix} \begin{bmatrix} -x_{e1} \\ y_{e1} \\ 0 \end{bmatrix}$$

— UCS coordinates — 24

— 25 Since there are 12 equations produced from 6 points P1-P6, the following minimization procedure is conducted to solve ten parameters.
$$\bar{P}_{M2} = \begin{bmatrix} \bar{u} \\ \bar{v} \end{bmatrix}$$

— 26 Parameter #7 - Θ (yawl)
$$T_\theta = \begin{bmatrix} \cos\theta & \sin\theta & 0 \\ -\sin\theta & \cos\theta & 0 \\ 0 & 0 & 1 \end{bmatrix}$$
where $T_\theta$ represents the in-lane rotation transformation in the (x,y) plane — 27 Parameter #8 Φ (pitch, pose rotation)
$$T_\phi = \begin{bmatrix} \cos\phi & 0 & \sin\phi \\ 0 & 1 & 0 \\ -\sin\phi & 0 & \cos\phi \end{bmatrix}$$
$T_{phi}$ represents the pose-rotation transformation in the (x,z) plane.

— 28 Parameter #9 Ψ (tilt rotation)
$$T_\psi = \begin{bmatrix} 1 & 0 & 0 \\ 0 & \cos\psi & \sin\psi \\ 0 & -\sin\psi & \cos\psi \end{bmatrix}$$
$T_\psi$ represents the tilt-rotation transformation in the (y,z) plane.

— 29 Parameter #10 α - scale

— 30 10 Parameters form vector $V_p = (x_{e1}, y_{e1}, x_{e2}, y_{e2}, x_m, y_m, \theta, \phi, \psi, \alpha)^t$

FIG. 3

31 — To account for change in origin – Measurements in Unified Coordinate System (UCS) begin at origin at mid point of face in the x direction and below the nose in the y direction. Measurement in the conventional system begin to the lower left corner. The following procedure is used to convert the coordinates from the conventional system to the UCS.

32 — Determining average coordinate position in horizontal direction $U_m$ $$U_m = \sum_{i=1}^{i=6} u_i/6$$
$$v_m = \sum_{i=1}^{i=6} v_i/6$$

33 — $\bar{u}_i = u_i - u_m$  Subtraction of average u coordinate position
$\bar{v}_i = v_i - v_m$  Subtraction of average v coordinate position 34 — 
$P_1 = (\bar{u}_1, \bar{v}_1, 0)$
$P_2 = (\bar{u}_2, \bar{v}_2, 0)$
$P_3 = (\bar{u}_3, \bar{v}_3, 0)$
$P_4 = (\bar{u}_4, \bar{v}_4, 0)$
$P_5 = (\bar{u}_5, \bar{v}_5, 0)$
$P_6 = (\bar{u}_i, \bar{v}_i, 0)$

FIG. 4

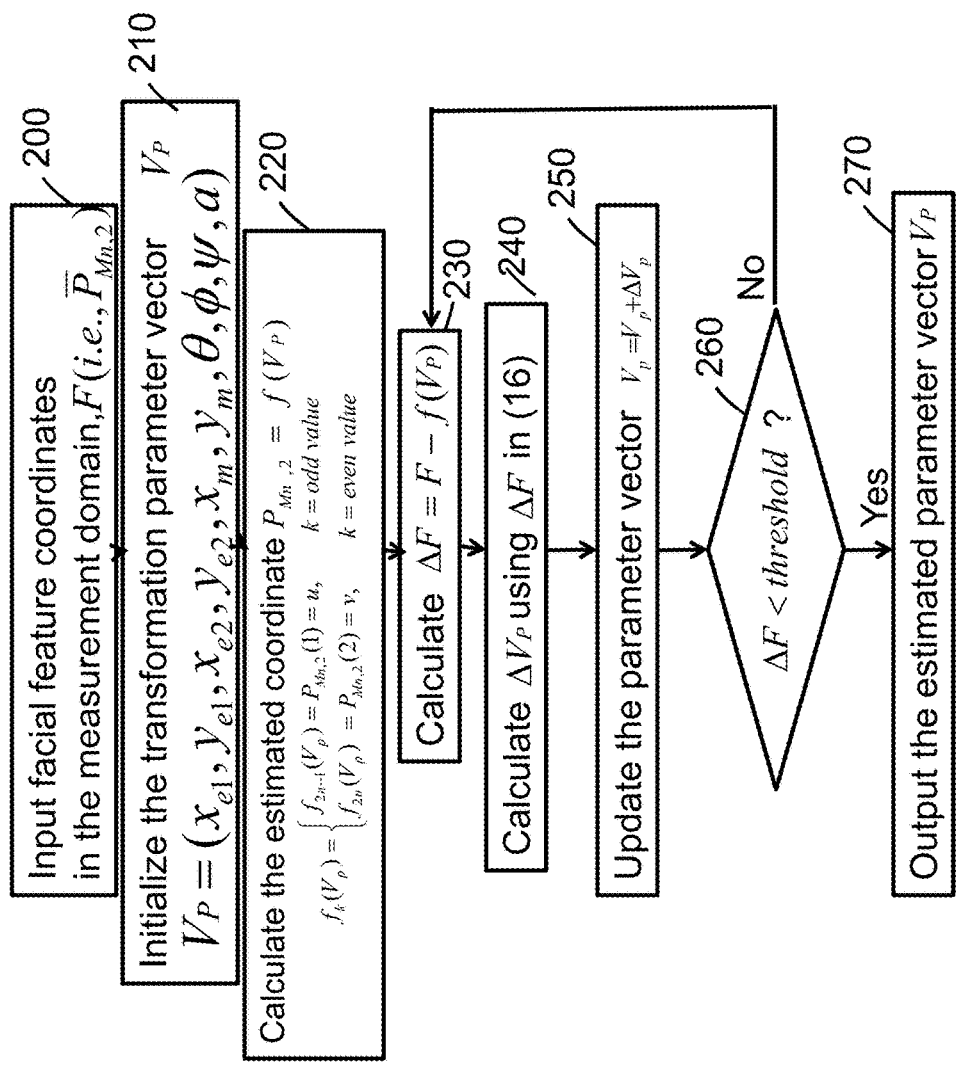
FIG. 8 Diagram of solving transformation parameter vector

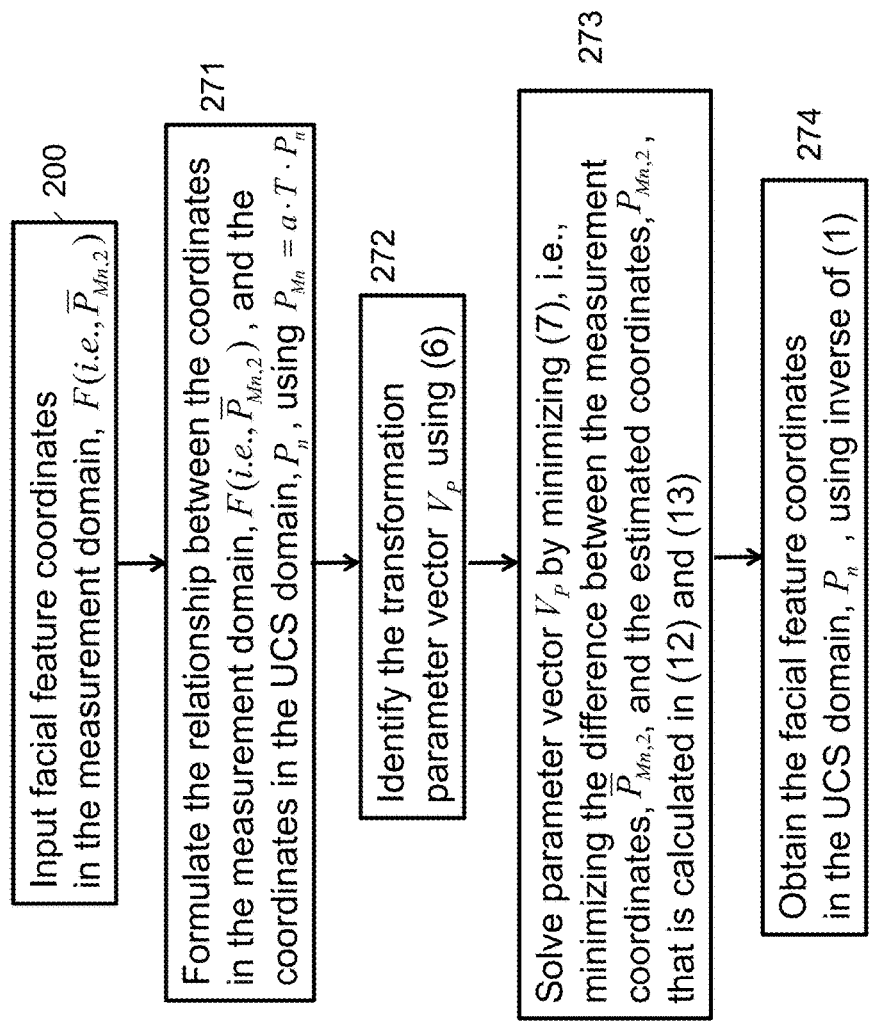
FIG. 9 Stereotactic registration

Face images with pose views

Two corners of eyes are not visible beyond 30⁰ pose view

INPUT COORDINATES - input the first corners of the eyes and mouth coordinates $F_1, F_2, F_3, F_4, F_5, F_6, F_7, F_8, F_9, F_{10}, F_{11}, F_{12}$ from the image into the at least one processor comprising data points in a vector $F = (F_1, \ldots, F_{12})^t$ where t represents the transpose, $F_1$ represents the horizontal coordinate of the left eye outer corner, $F_2$ represents the vertical coordinate of the left eye outer corner, $F_3$ represents the horizontal coordinate of the left eye inner corner, $F_4$ represents the vertical coordinate of the left eye inner corner, $F_5$ represents the horizontal coordinate of the right eye outer corner, $F_6$ represents the vertical coordinate of the right eye outer corner, $F_7$ represents the horizontal coordinate of the right eye inner corner, $F_8$ represents the vertical coordinate of the right eye inner corner, $F_9$ represents the horizontal coordinate of the left mouth corner, $F_{10}$ represents the vertical coordinate of the left mouth corner, $F_{11}$ represents the horizontal coordinate of the right mouth corner, and $F_{12}$ represents the vertical coordinate of the right mouth corner;

---

CONVERSION OF THE INPUT COORDINATES $F_1, F_2, F_3, F_4, F_5, F_6, F_7, F_8, F_9, F_{10}, F_{11}, F_{12}$ into second coordinates for the corners of the eye and mouth in a virtual vertical or common plane comprising
$P_1 = (-x_{e1}, y_{e1}, 0) \quad P_2 = (-x_{e2}, y_{e2}, 0) \quad P_3 = (x_{e1}, y_{e1}, 0) \quad P_4 = (x_{e2}, y_{e2}, 0) \quad P_5 = (-x_m, y_m, 0) \quad P_6 = (x_m, y_m, 0)$

---

Where $P_1$ is the estimated left eye outer corner coordinates, $P_2$ is the estimated left eye inner corner coordinates, $P_3$ is the estimated right eye outer corner coordinates, $P_4$ is the estimated right eye inner corner coordinates, $P_5$ is the estimated left mouth corner coordinates and $P_6$ is the estimated right mouth corner coordinates and x and y represent horizontal and vertical distances from a facial reference point, and to determine the head orientation of the human subject using roll, yaw and pitch relative to the virtual vertical plane where, $\Theta$ represents the yaw, $\phi$ represents the pitch, and $\psi$ represents the roll;

---

Solve for the parameter vector $V_p$ where $\quad V_p = (x_{e1}, y_{e1}, x_{e2}, y_{e2}, x_m, y_m, \theta, \phi, \psi)^t$ and $\quad x_{e1}, y_{e1}, x_{e2}, y_{e2}, x_m, y_m$ represent the virtual plane coordinates of the corners of the eyes and mouth in the vertical virtual plane, and wherein the error to be minimized is the error between the inputted corners of the eyes and mouth coordinates $F_1, F_2, F_3, F_4, F_5, F_6, F_7, F_8, F_9, F_{10}, F_{11}, F_{12}$ and the least square estimation model function $f(V_p)$ coordinates of the estimated inputted corners of the eyes and mouth coordinate values comprising horizontal coordinates $f_1(V_p), f_3(V_p), f_5(V_p), f_7(V_p), f_9(V_p), f_{11}(V_p),$ and vertical coordinates $f_2(V_p), f_4(V_p), f_6(V_p), f_8(V_p), f_{10}(V_p), f_{12}(V_p)$

Fig. 21A

ESTIMATED INPUTTED CORNERS OF THE EYES AND MOUTH COORDINATE VALUES
comprising horizontal and vertical coordinates $$f_1(V_p) = [1,0,0]T\, P_1$$
$$f_2(V_p) = [0,1,0]T\, P_1$$
$$f_3(V_p) = [1,0,0]T\, P_2$$
$$f_4(V_p) = [0,1,0]T\, P_2$$
$$f_5(V_p) = [1,0,0]T\, P_3$$
$$f_6(V_p) = [0,1,0]T\, P_3$$
$$f_7(V_p) = [1,0,0]T\, P_4$$
$$f_8(V_p) = [0,1,0]T\, P_4$$
$$f_9(V_p) = [1,0,0]T\, P_5$$
$$f_{10}(V_p) = [0,1,0]T\, P_5$$
$$f_{11}(V_p) = [1,0,0]T\, P_6$$
$$f_{12}(V_p) = [0,1,0]T\, P_6$$

HEAD ORIENTATION – YAW, PITCH AND ROLL $T_{\theta,\phi,\psi}$ correlates to the head orientation and the matrix $T = T_\theta \cdot T_\phi \cdot T_\psi$ where
$$T_\theta = \begin{bmatrix} \cos\theta & \sin\theta & 0 \\ -\sin\theta & \cos\theta & 0 \\ 0 & 0 & 1 \end{bmatrix} \quad T_\phi = \begin{bmatrix} \cos\phi & 0 & \sin\phi \\ 0 & 1 & 0 \\ -\sin\phi & 0 & \cos\phi \end{bmatrix} \quad T_\psi = \begin{bmatrix} 1 & 0 & 0 \\ 0 & \cos\psi & \sin\psi \\ 0 & -\sin\psi & \cos\psi \end{bmatrix}$$

Fig. 21B

SYSTEM AND METHOD FOR FACE RECOGNITION WITH TWO-DIMENSIONAL SENSING MODALITY

GOVERNMENT INTEREST

The invention described herein may be manufactured, used, and/or licensed by or for the United States Government without the payment of royalties

BACKGROUND OF THE INVENTION

Face recognition includes the process of recognizing an individual by comparing the captured face image against one or more stored face images to identify a match. The stored images are usually called the gallery or watch list databases. The captured image or video is usually called the probe.

In national security or military applications, there is a need for nighttime personnel target identification. At night or in darkness (without illumination), a visible face image (produced using visible light) is of limited use for identification. Thermal face images are found to be more useful at night since the thermal face images can be acquired by thermal sensors without external illumination. The thermal camera measures the heat (temperature) that is emitted (radiated) from the human face. However, most watch list databases contain visible imagery. For a given picture, visible sensors measure the light reflected from the facial surface at a single observation angle. The thermal face images and the visible face images are very different in appearance; but there is a need for cross modality face recognition, i.e., thermal-to-visible face recognition. Thermal-to-visible face recognition would include the identification of a person in a thermal image by comparing the person's thermal facial image to many visible facial images in a database or watch list.

Another challenge in facial recognition occurs during adverse conditions, such as during night time surveillance when frequently the images of the subject are not in a still or frontal position, but instead consist of multiple 3-D head rotations (pose angles). Different pose angles and different illumination conditions can result in different images. For example, the face image of a person in a side view is very different from the image of the same person in a frontal view. It is beneficial to consider the pose changes in face recognition.

The research on thermal face recognition is summarized in (1) C. S. Martin et. al., "Recent advances on face recognition using thermal infrared images," Reviews, Refinements and New Ideas in Face Recognition, InTech Open Access Publisher, edited by Peter M. Corcoran, Chapter 5, pp. 95-112, July 2011; (2) M. K. Bhowmik, et. al., "Thermal infrared face recognition—a biometric identification technique for robust security system," Reviews, Refinements and New Ideas in Face Recognition, InTech Open Acess Publisher, edited by Peter M. Corcoran, Chapter 6, pp. 114-138, July 2011 ; (3) L. B. Wolff , D. A. Socolinsky, and C. K. Eveland, "Face recognition in the thermal infrared," Computer Vision Beyond the Visible Spectrum Book, pp. 167-191, Springer London, 2006). Thermal imagery has less texture information. However, thermal imagery is less sensitive to illumination variation and expression changes. It has certain applications for nighttime personnel identification that is crucial to national security and military operations. U.S. Pat. No. 7,406,184, to L. B. Wolf, entitled "Method and apparatus for using thermal infrared for face recognition," Jul. 29, 2008, discloses a method of incorporating the use of thermal face imagery into an end-to-end face recognition system to mitigate the influence of varying ambient illumination on systems using visible imagery. In this method, both visible face images and thermal face images are used to create a face representation template that is matched or compared with a stored database or gallery of face templates. The system requires both visible imagery and thermal imagery of an individual (wanted individual) in the probe. For a nighttime operation especially without an external illumination, this condition is not easy to meet.

Cross-modality face recognition research, in which the gallery contains images in one modality (e.g., visible) and the probe contains images in another modality (e.g., thermal), generally work using the existing techniques that were designed for visible face recognition (such as using a variation of edge information). U.S. Pat. No. 7,512,255, entitled "Multi-modal face recognition," discloses a method to identify an individual using visible and infrared images using a sequence of multimodal data (3D from multiple visible light cameras, 2D infrared) and employing an Annotated Face Model (AFM), which is a 3D segmented facial model.

Generally, there are three common approaches to the problem of pose changes in facial recognition using two dimensional data. First, the training set contains many face images with different poses, which requires multiple datasets. An extension of this type of approach is to train each pose-specific face classifier with multiple examples of that pose. Then, the output of these classifiers is fused to give a face recognizer that can process a wider range of facial poses (for example, see U.S. Pat. No. 7,542,592 to Huang, Pose-invariant Face Recognition System and Process"). Second, for each input image, the estimate of the pose is calculated and then the input image is normalized to a virtual frontal view pose before it is matched against the gallery (see for example, U.S. Pub. Pat. App. No. 2010/0284577, "Pose-variant face recognition using multiscale local descriptors," Nov. 11, 2010).

A third approach is to use multiple 2D images to estimate a 3D face model. The 3D geometry information can be used for pose correction (see U.S. Pub. Pat, Application No. 2010/0149177, "Generation of normalized 2D imagery and IS systems via 2D to 3D lifting of multifeatured objects," Jun. 17, 2010, M. I. Miller).

When using 3D sensor data, a 3D face model can be established, which requires a high-resolution 3D sensor (see U.S. Pub. Pat. Application No. 2006/0120571 A1, "System and method for passive face recognition," Jun. 8, 2006, P. H. Tu, et. al).

Visible sensor measures the reflectance of light from the object. Infrared sensor measures the heat transmitted from the object. Face images that are acquired from visible sensor and infrared sensor represent different face phenomena. Pose rotations of the human head can produce significant changes and distortions in the facial appearance of a person in the face image. Such effects cause degradation of face recognition performance, resulting in possible performance degradation.

Sensors of different modalities measure different properties of the object. Visible light and thermal infrared are in different spectrum. Therefore, visible sensors and thermal sensors capture different physical properties of the human face. Because of these physical variations, they are translated into different features.

One example is that edges are not aligned to each other in thermal and visible images. Human visual system and manmade algorithms do use edge as the primary information for recognition purposes. However, if e edge information is used to match thermal and visible face images, they do not quite match.

Other examples are that when imagery of a person is acquired from different sensors at different time, they do not have the same 3D orientation angles. This is a very common phenomenon. In a practical situation, the camera might not be exactly looking straightly at the face when the image is acquired. If one wants to match face images with different poses, one needs to address the 3D transformation among them first.

There exists a need to identify a personnel target when the probe image and gallery image are in different modalities. There exists a need to utilize common structures. There also exists a need to (biometric landmarks) characterize both images from gallery and probe, e.g., visible and thermal images.

It is known to use biometric landmarks such as the eyes and mouth to capture the predominate identifying features of an image. For example, Intel® Perceptual Computing SDK—How to use the Face Detaction Software, https://software.intel.com/en-us, Oct. 30, 2012, discloses The Intel® Perceptual Computing SDK, which is a library of pattern detection and recognition algorithm implementations exposed through standardized interfaces. The SDK provides a suite of face analysis algorithms including face location detection, landmark detection, face recognition and face attribute detection. The Intel face detection algorithm locates the rectangle position of a face or multiple faces from an image or a video sequence in real-time capture or playback mode. The detection algorithm locates the 6 point or 7 point landmarks namely, the outer and inner corners of the eyes, the tip of the noise, and the outer corners of the mouth.

Since the face images do not have the same 3D orientation angles when they are acquired from different sensors and/or at different times, there is a need to develop a new 3D registration method via a single frame for face images having 3D pose angles.

It is difficult for a machine to search facial photos for a match in part because when a person's photo appears in a non-standard position, the orientation of the face is different; i.e., the faces are generally pointed at an angle to the vertical plane of the camera. Because the orientation of the face is different, the coordinates of the facial features do not match those of a pose position in which the subject's head is upright and aligned with the camera (commonly referred to as a mug shot).

SUMMARY OF THE INVENTION

A preferred embodiment and method of the present invention provides a method and system for face recognition when face images in the gallery and probe are in different modalities and/or have different 3D pose angles due to the fact that they are acquired by different sensors and/or at different times. A preferred embodiment converts the coordinates of the eyes and mouth of a facial image appearing in a randomly oriented photograph to virtual coordinates corresponding to an estimate of how the head and facial coordinates would appear if the subject's head were to be turned such that the centers of the eyes and corner of the mouth were oriented in a vertical plane; i.e., the roll, pitch, and yaw are zero and the scale is one. The estimate is obtained using models based upon a non-linear Gaussian Least Square Differential Correction. The matching is performed based on matching the virtual coordinates of facial images in the probe against ones in the gallery.

The present invention provides a new system to mitigate degradation sources due to cross modality. It utilizes common biometric landmarks characterizing both visible and thermal images. Since the edge information and texture information do not correspond to each other in visible and thermal imagery, only common features remain for visible and thermal images of the same person. They are biometric landmarks, such as eye locations, mouth location, etc. The present invention also provides a new 3D registration method via a single frame for face images having 3D pose angles.

A preferred embodiment of the present invention comprises a system for facial recognition using an image of a human in which the eyes and mouth corners are not in a vertical plane when the image was taken to determine estimated virtual plane coordinates corresponding to estimated location of eyes and mouth corners of the human when the eyes and mouth corners are in a vertical plane; the system comprising:

at least one processor configured to determine the virtual plane coordinates;

at least one input operatively connected to the at least one processor and configured to input the first corners of the eyes and mouth coordinates $F_1, F_2, F_3, F_4, F_5, F_6, F_7, F_8, F_9, F_{10}, F_{11}, F_{12}$ from the image into the at least one processor comprising data points in a vector $$F=(F_1, \ldots, F_{12})^t$$

where t represents the transpose, $F_1$ represents the horizontal coordinate of the left eye outer corner, $F_2$ represents the vertical coordinate of the left eye outer corner, $F_3$ represents the horizontal coordinate of the left eye inner corner, $F_4$ represents the vertical coordinate of the left eye inner corner, $F_5$ represents the horizontal coordinate of the right eye outer corner, $F_6$ represents the vertical coordinate of the right eye outer corner, $F_7$ represents the horizontal coordinate of the right eye inner corner, $F_8$ represents the vertical coordinate of the right eye inner corner, $F_9$ represents the horizontal coordinate of the left mouth corner, $F_{10}$ represents the vertical coordinate of the left mouth corner, $F_{11}$ represents the horizontal coordinate of the right mouth corner, and $F_{12}$ represents the vertical coordinate of the right mouth corner;

the at least one processor configured to convert the first coordinates $F_1, F_2, F_3, F_4, F_5, F_6, F_7, F_8, F_9, F_{10}, F_{11}, F_{12}$ into second coordinates for the corners of the eye and mouth in a virtual vertical plane comprising $P_1=(-x_{e1},y_{e1},0)$, $P_2=(-x_{e2},y_{e2},0)$, $P_3=(x_{e1},y_{e1},0)$, $P_4=(x_{e2},y_{e2},0)$, $P_5=(-x_m,y_m,0)$, and $P_6=(x_m,y_m,0)$, where $P_1$ is the estimated left eye outer corner coordinates, $P_2$ is, the estimated left eye inner corner coordinates, $P_3$ is the estimated right eye outer corner coordinates, $P_4$ is the estimated right eye inner corner coordinates, $P_5$ is the estimated left mouth corner coordinates and $P_6$ is the estimated right mouth corner coordinates and x and y represent horizontal and vertical distances from a facial reference point, and to determine the head orientation of the human subject using roll, yaw and pitch relative to the virtual vertical plane where, $\theta$ represents the yaw, $\varphi$ represents the pitch, and $\Psi$ represents the roll;

the at least one processor configured to solve for the parameter vector $V_p$ comprising 9 parameters $x_{e1}, y_{e1}, x_{e2}, y_{e2}, x_m, y_m, \theta, \varphi, \psi$ using the following equation:

$$V_p=(x_{e1},y_{e1},x_{e2},y_{e2},x_m,y_m,\theta,\varphi,\psi)^t$$

where $x_{e1}, y_{e1}, x_{e2}, y_{e2}, x_m, y_m$ represent the virtual plane coordinates of the corners of the eyes and mouth in the vertical virtual plane, and wherein the error to be minimized is the error between the inputted corners of the eyes and mouth coordinates $F_1, F_2, F_3, F_4, F_5, F_6, F_7, F_8, F_9, F_{10}, F_{11}, F_{12}$ and the least square estimation model function $f(V_p)$ coordinates of the estimated inputted corners of the eyes and mouth coordinate values comprising horizontal coordinates $f_1(V_p), f_3(V_p), f_5(V_p), f_7(V_p) f_9(V_p), f_{11}(V_p)$, and vertical coordinates $f_2(V_p), f_4(V_p), f_6(V_p), f_8(V_p), f_{10}(V_p), f_{12}(V_p)$ and where the least square model function $f(V_p)$ is computed using $f_1(V_p)=[1,0,0]T\ P_1$
$f_2(V_p)=[0,1,0]T\ P_1$
$f_3(V_p)=[1,0,0]T\ P_2$
$f_4(V_p)=[0,1,0]T\ P_2$
$f_5(V_p)=[1,0,0]T\ P_3$
$f_6 V_p)=[0,1,0]T\ P_3$
$f_7(V_p)=[1,0,0]T\ P_4$
$f_8(V_p)=[0,1,0]T\ P_4$
$f_9(V_p)=[1,0,0]T\ P_5$
$f_{10}(V_p)=[0,1,0]T\ P_5$
$f_{11}(V_p)=[1,0,0]T\ P_6$
$f_{12}(V_p)=[0,1,0]T\ P_6$ where T correlates to the head orientation $\theta, \varphi, \psi$ and the matrix $$T = T_\theta \cdot T_\varphi \cdot T_\psi$$

where $$T_\theta = \begin{bmatrix} \cos\theta & \sin\theta & 0 \\ -\sin\theta & \cos\theta & 0 \\ 0 & 0 & 1 \end{bmatrix}$$

$$T_\phi = \begin{bmatrix} \cos\phi & 0 & \sin\theta \\ 0 & 1 & 0 \\ -\sin\phi & 0 & \cos\phi \end{bmatrix}$$

$$T_\psi = \begin{bmatrix} 1 & 0 & 0 \\ 0 & \cos\psi & \sin\psi \\ 0 & -\sin\psi & \cos\psi \end{bmatrix}.$$

whereby the virtual plane coordinates are used to search a database of a plurality of images of people represented by either virtual plane or vertical plane coordinates in order to identify or recognize an individual.

These and other aspects of the present invention will be described in more detail below in conjunction with the following drawings.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 1 is an illustration of a flow chart providing a partial overview of the present invention including a description of a vector comprising ten parameters which include, inter alia, yaw, pitch and roll of the subject's pose.

FIG. 3 is an illustration which continues from FIG. 2 and illustrates, inter alia, the conversion and/or transposition of coordinates which take into account, inter alia, yaw, pitch and roll.

FIG. 4 is an illustration showing a flow chart illustrating the solving for unknown parameters using the Gaussian Least Squares Differential Correction (GLSDC).

FIG. 8 is a diagram for solving a transformation parameter vector.

FIG. 9 illustrates a graphic view showing the stereotactic registration.

FIG. 21A is a flow chart of the methodology of a preferred embodiment of the present invention.

FIG. 21B is a continuing flow chart of the methodology of a preferred embodiment of the present invention.

DETAILED DESCRIPTION OF THE PREFERRED EMBODIMENTS

Figure 2:
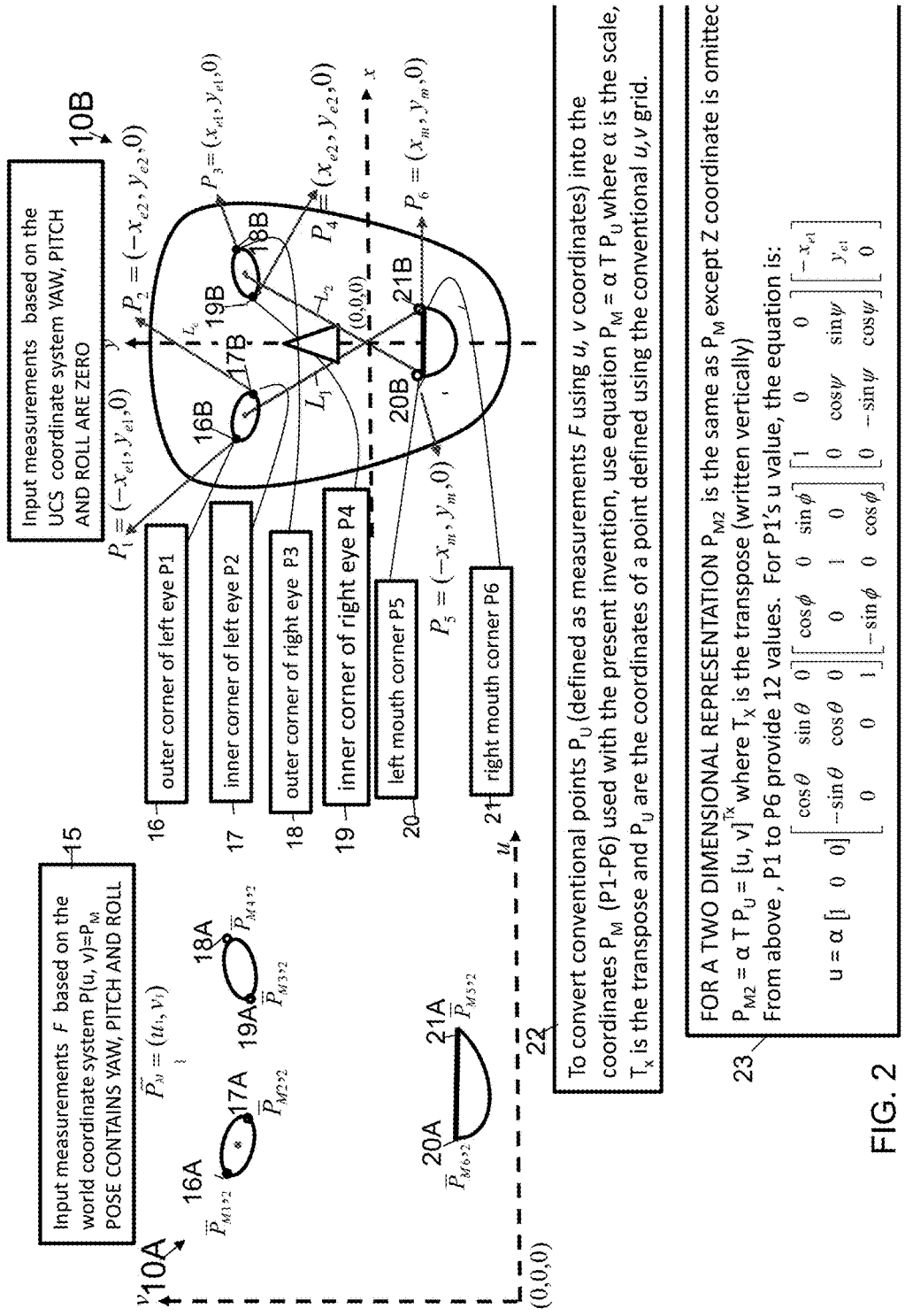
FIG. 2 is an illustration of a comparison between prior art coordinate systems and the coordinate system in accordance with the principles of the present invention and part of the conversion procedure.
Figure 5:
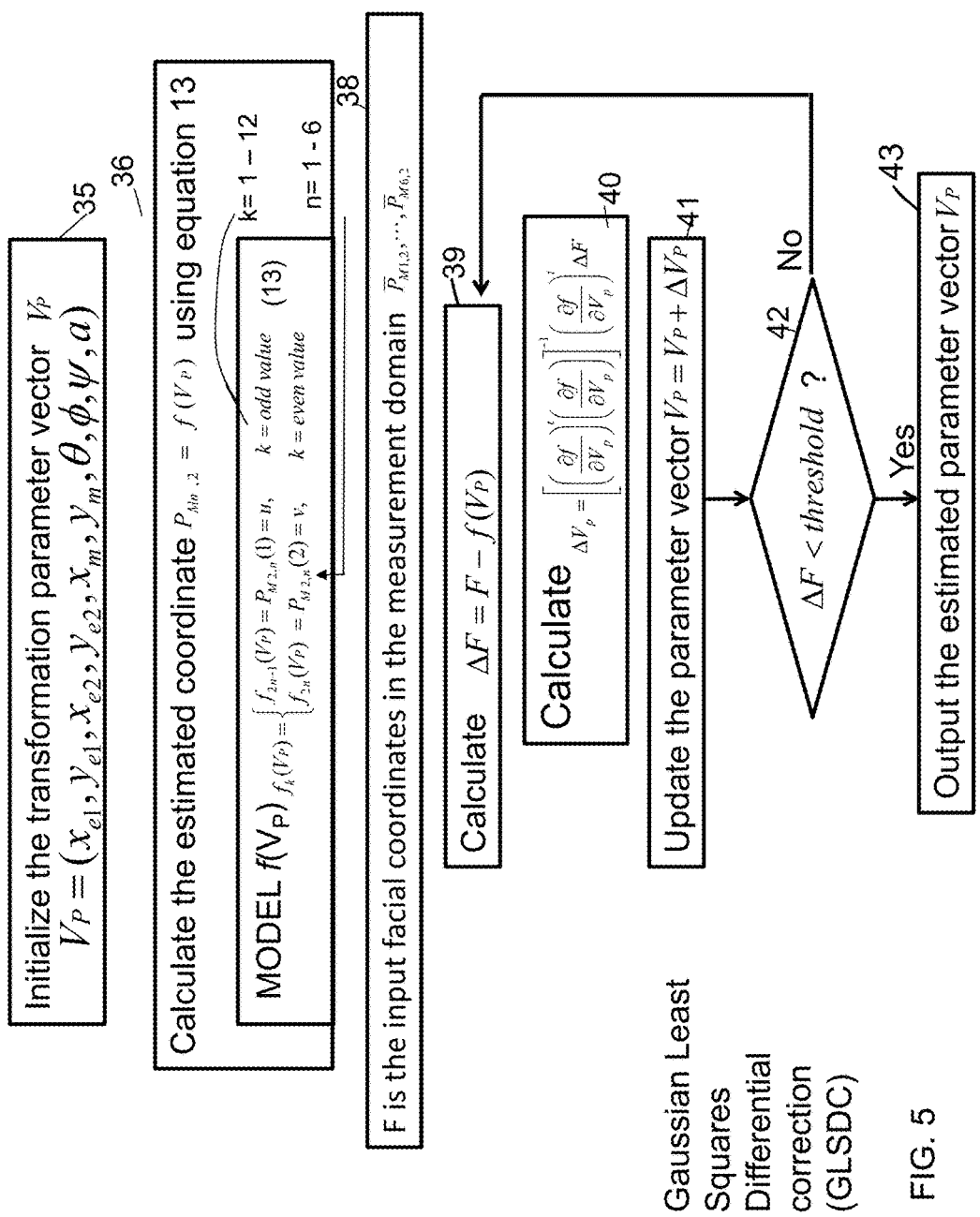
FIG. 5 is an illustration showing a flow chart illustrating the solving for unknown parameters using the Gaussian Least Squares Differential Correction (GLSDC).

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 6:
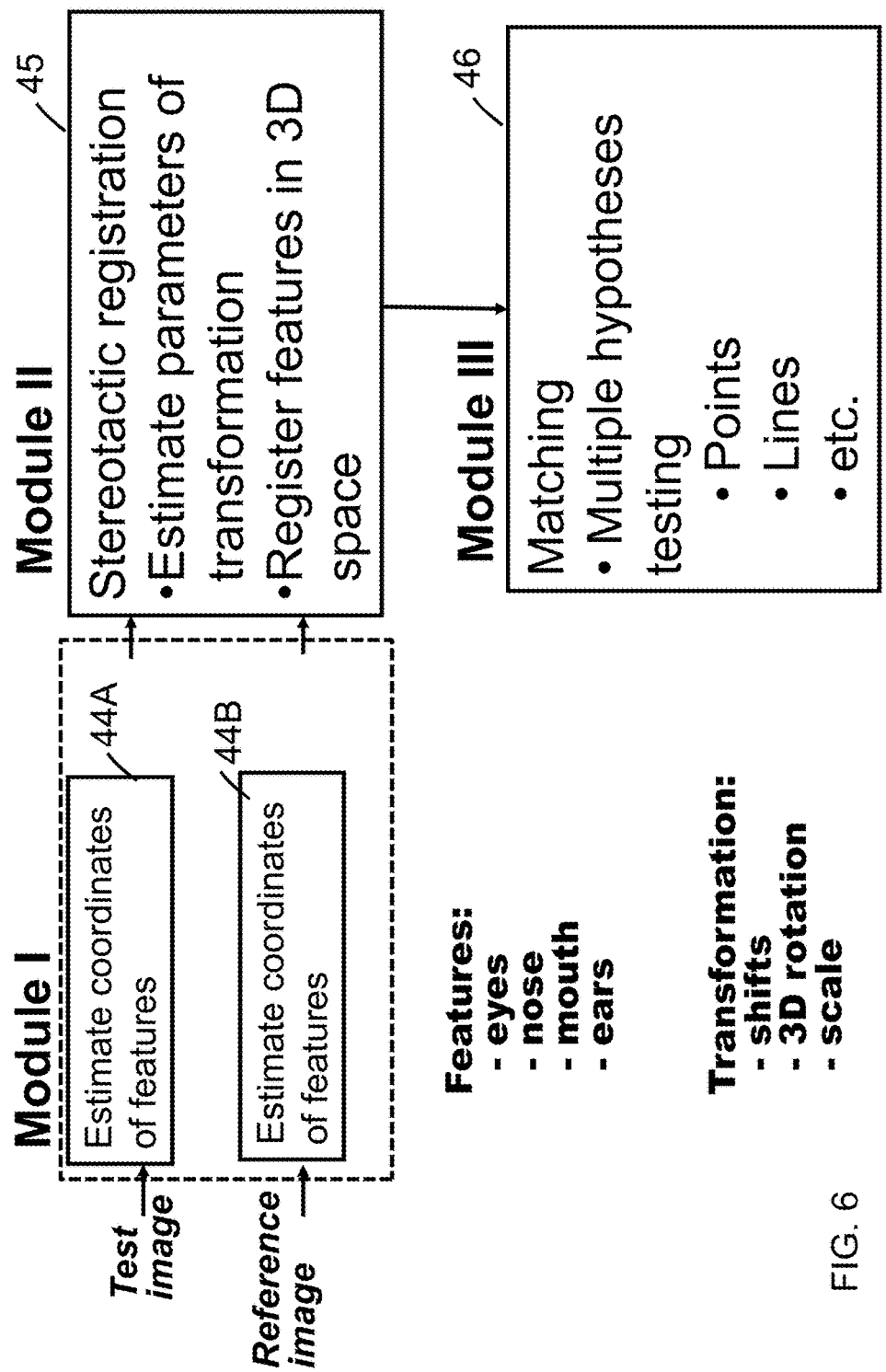
FIG. 6 is schematic representation of modules I, II and II.

A flow chart of a preferred embodiment of the present invention is shown in FIG. 6, which contains 3 modules. The thermal test image and visible reference image are input to the Module I, which estimates coordinates of features for both thermal test image and visible reference image. These are biometric landmarks of the human face, such as eyes, nose, mouth, ears, etc. Many available algorithms have been researched (see (1) U.S. Pub. Pat. App. No. 2012/0308124, "Method and system for localizing parts of an object in an image for computer vision applications," Dec. 6, 2012, P. N. Belhumeur; (2) European Pat. No. 1 811 456 B1, "Face feature point detector and feature point detector," Nov. 12, 2004, K. Kinoshita; (3) P. Viola and M. Jones, "Robust real-time object detection," Second International Workshop On Statistical And Computational Theories Of Vision— Modeling, Learning, Computing, And Sampling, pp. 1-25, Vancouver, Canada, Jul. 13, 2001). Visible and thermal images are acquired from different sensors. They need to be registered first. Module II (45) performs the stereotactic registration based on those features, or sub-set of those features. For example, when the ear features are available, the algorithm uses features including ears. When the ear features are not available, the algorithm uses the sub-set of features that exclude ears. The algorithm takes available and reliable features and performs the constraint optimization using those features. The registration transformation includes shifts, 3D rotations, and scale. Module III (46) performs the matching based on multiple hypotheses testing theory, which uses the features other than edges to correlate the visible and thermal face images.

Pictures of subjects are taken with their faces not pointed directly at the camera so that the face images may contain yaw (pose rotation left and right), pitch (head tile rotation (up and down), and roll (in plane rotation). Also, pictures of a subject may be taken using a different modality (such as a thermal camera instead of a conventional camera). Accordingly, facial recognition in pictures are taken with the head of a subject not pointed directly at the camera may be effected by yaw (pose rotation left and right) pitch (head tilt up and down), and roll (in plane rotation). In accordance with a preferred embodiment of the present invention, yaw, pitch and roll are incorporated into a Unified Coordinate system (UCS). The Unified Coordinate System includes yaw, pitch and roll of the subject's head and defines by measures the location of the inner and outer points of the two eyes and inner and outer points of the mouth, Optionally, a preferred embodiment comprises the development of a parameter vector $V_p$ which comprises the six coordinates of the eyes and mouth, the yaw, pitch and roll of the subject's head and the scale (size) of the face. The parameter vector is defined as $V_p=(x_{e1},y_{e1},x_{e2},y_{e2},x_m,y_m,\theta,\varphi,\psi,\alpha)^t$ where $x_{e1}$, $y_{e1}$, $x_{e2}$, $y_{e2}$, $x_m$, & $y_m$ are the coordinates used to define the previously mentioned six points of defining the eyes and mouth and $\theta$ defines the yaw, $\varphi$ defines the pitch and $\Psi$ defines the roll and $\alpha$ defines the scale.

As illustrated in FIG. 1, pictures of subjects are taken with their faces not pointed directly at the camera so that face images may contain yaw (pose rotation left and right), pitch (head tile rotation (up and down), and roll (in plane rotation). Also, pictures of a subject may be taken using a different modality (such as a thermal camera instead of a conventional camera). Accordingly, facial recognition in pictures are taken with the head of a subject not pointed directly at the camera may be effected by yaw (pose rotation left and right) pitch (head tilt up and down), and roll (in plane rotation). In accordance with a preferred embodiment of the present invention, yaw, pitch and roll are incorporated into a Unified Coordinate system (UCS). The Unified Coordinate System includes yaw, pitch and roll of the subject's head and defines by measures the location of the inner and outer points of the two eyes and inner and outer points of the mouth, Optionally, a preferred embodiment comprises the development of a parameter vector $V_p$ which comprises the six coordinates of the eyes and mouth, the yaw, pitch and roll of the subject's head and the scale (size) of the face. The parameter vector is defined as $V_p=(x_{e1},y_{e1},x_{e2},y_{e2},x_m,y_m,\theta,\varphi,\psi,\alpha)^T$ where $x_{e1}$, $y_{e1}$, $x_{e2}$, $y_{e2}$, $x_m$, & $y_m$ are the coordinates used to define the previously mentioned six points of defining the eyes and mouth and $\theta$ defines the yaw, $\varphi$ defines the pitch and $\Psi$ defines the roll and $\alpha$ defines the scale.

Referring now to FIG. 2, shown are two facial images 10A and 10B. Facial image 10A overlays a grid using coordinates u, v in the world coordinate system and Face image 10B overlays a grid using the Unified Coordinate system of the present invention. For the image 10A, the biometric features of the outer and inner corners of the left eye, 16A, 17A, outer and inner of the right eye, 18A, 19A, and the corners of the mouth 20A, 21A are shown. Similarly, for the image 10B, the biometric features of the outer and inner corners of the left eye, 16B, 17B, outer and inner of the right eye, 18B, 19B, and the corners of the mouth 20B, 21B are shown. Image 10A is a conventional image taken with unknown values relating to yaw, pitch or roll. The image 10B is taken with the face in a pose such that the eyes and the mouth are in the same vertical plane. For the purposes of the Unified Coordinate System (UCS) the origin point 0 (0,0,0) of the face plane is defined as the intersection of two lines $L_1$ and $L_2$, as shown in FIG. 2. The line $L_1$ connects the center of two corners of left eye and the right corner of mouth. The line $L_2$ connects the center of two corners of right eye and the left corner of mouth. In order to have this plane that passes through these four points being vertical, the human head is tilted from the normal frontal pose. These lines form the central or face plane of the image 10B from which the yaw, pitch and roll are to be measured. By definition, the yaw, pitch and roll is zero when the center of the eyes and corners of the lips are in the same vertical plane. The intersection of the lines further defines the origin (0,0,0)

of the Unified Coordinate System developed in accordance with the principles of the present invention. The Unified Coordinate System defines the locations of the eyes and mouth on the basis of the distance from the middle of the face in the "x" direction and the distance from the origin.

Since the face is generally symmetrical in the lateral or "x" direction, measurements for the six points P1 through P6. The left eye outer corner is represented by $P_1=(-x_{e1}, y_{e1}, 0)$. The left eye inner corner is represented by $P_2=(-x_{e2}, y_{e2}, 0)$. The right eye outer corner is represented by $P_3=(x_{e1}, y_{e1}, 0)$. The right eye inner corner is represented by $P_4=(x_{e2}, y_{e2}, 0)$. The left mouth corner is represented by $P_5=(-x_m, y_m, 0)$ and the right mouth corner is $P_6=(x_m, y_m, 0)$. Due to symmetry, the 6 points may be represented by six parameters $X_{e1}, X_{e2}, Y_{e1}, Y_{e2}, X_m$ and $Y_m$, where $x_{e1}$ and $y_{e1}$ represent the outer corners of two eyes, $x_{e2}$ and $y_{e2}$ represent the inner corners of two eyes, and $x_m$ and $y_m$ represent the corners of mouth, which form the first six parameters for the parameter vector $V_p$. These 6 parameters define the face plane. The remaining parameters represent the yaw θ, pitch Φ, roll Ψ, and scale.

Referring now to the conventional image 10A of FIG. 2, the locations for the biometric features of the outer and inner corners of the left eye, 16A, 17A, outer and inner of the right eye, 18A, 19A, and the corners of the mouth 20A, 21A may be determined by measuring the distance from the U and V axes. However, the yaw θ, pitch Φ, roll Ψ are unknown.

Facial images points 10A are measurements in the conventional system with the origin located to the left of and below the facial image 10A as depicted in FIG. 2. To convert coordinates 10A into coordinates of the Unified Coordinate, the first step, depicted in Box 32 in FIG. 4 is to determine the average coordinate positions in the horizontal and vertical positions as shown in Box 32. The center of mass equations are utilized as $U_M = \Sigma U_i/6$ where i varies from 1 to 6 and $V_M = \Sigma V_i/6$ (see Box 32). The center of mass $U_M$ and $V_M$ is then subtracted from the U and V coordinates to yield the corrected $\overline{U}$ as shown in Boxes 33 and 34.

Box 22 of FIG. 2 is directed to the conversion of the points 16A, 17A, 18A, 19A, 20A, and 21A (defined as measurements using the U, V, coordinates into the coordinates P1 through P6 of the Unified Coordinate System (UCS) used with the preferred embodiment of the present invention. Note that the pointes 16A through 21A do not take into account the yaw, pitch and roll, which is done using the following methodology.

In order to convert the measurement of the Image 10A (points 16A-21A) into the Unified Coordinate System, the yaw, pitch and roll must be taken into account. For each landmark point (corners of eyes and mouth) on a face, the transformation equation is written as, $$P_{Mn} = \alpha \cdot T \cdot P_n \quad (1)$$

where $P_{Mn}=[u,v,r]^t$ represents the coordinates of a landmark of an acquired face image in the measurement (image) domain, $P_n=[x,y,z]^t$ represents the coordinates of a landmark in the UCS domain, α is the scale factor, and t is the transformation matrix. This transformation matrix is written as, $$T = T_{si} \cdot T_{phi} \cdot T_{te} \quad (2)$$

where $T_{te}$ represents the in-lane rotation transformation in the (x,y) plane, that is, $$T_{te} = \begin{bmatrix} \cos\theta & \sin\theta & 0 \\ -\sin\theta & \cos\theta & 0 \\ 0 & 0 & 1 \end{bmatrix}, \quad (3)$$

$T_{phi}$ represents the pose-rotation transformation in the (x,z) plane, that is, $$T_{phi} = \begin{bmatrix} \cos\phi & 0 & \sin\theta \\ 0 & 1 & 0 \\ -\sin\phi & 0 & \cos\phi \end{bmatrix}, \quad (4)$$

Figure 10A:
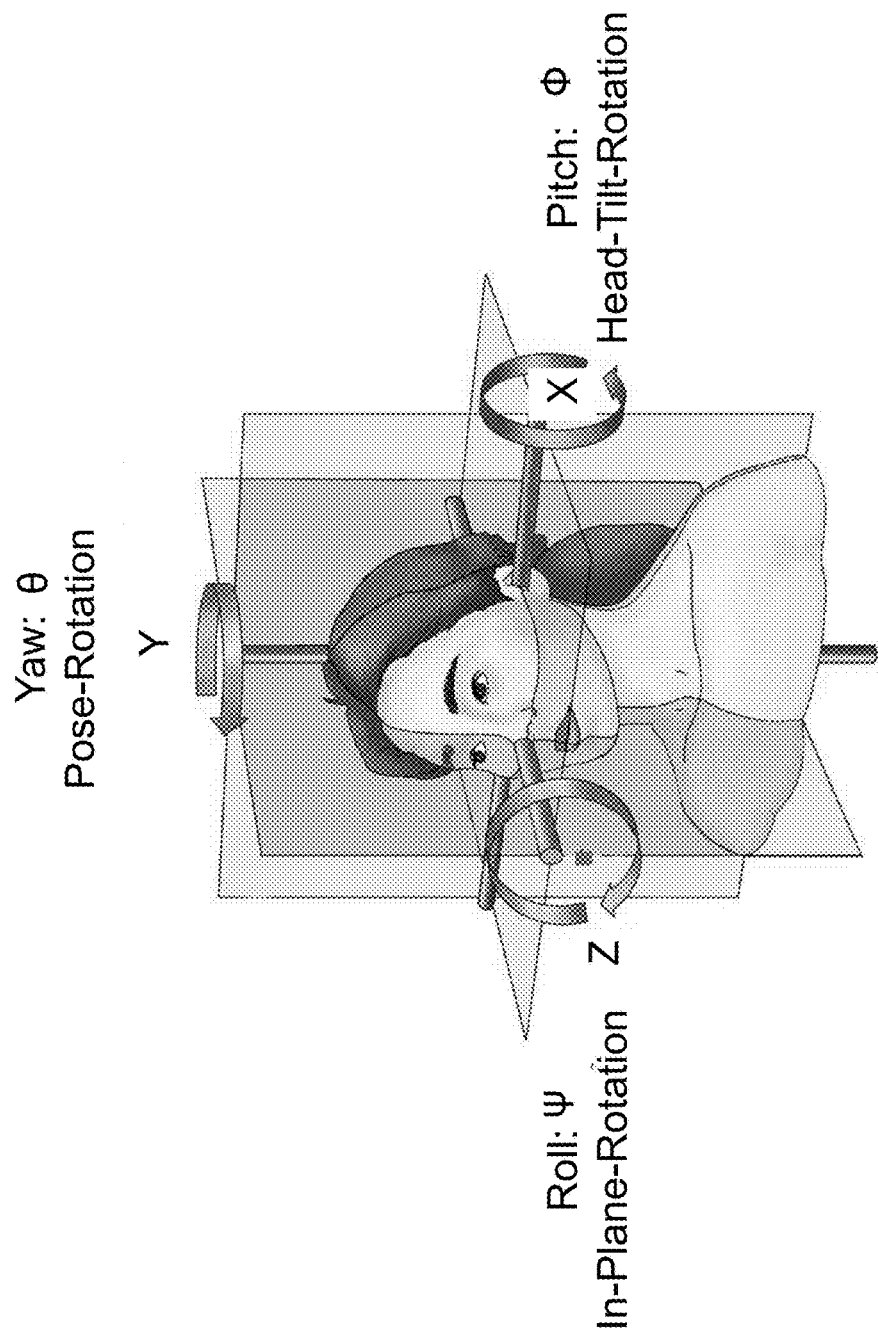
FIG. 10A is an illustration showing the pose of a person and the rotation directions for yaw, roll and tilt.
Figure 10B:
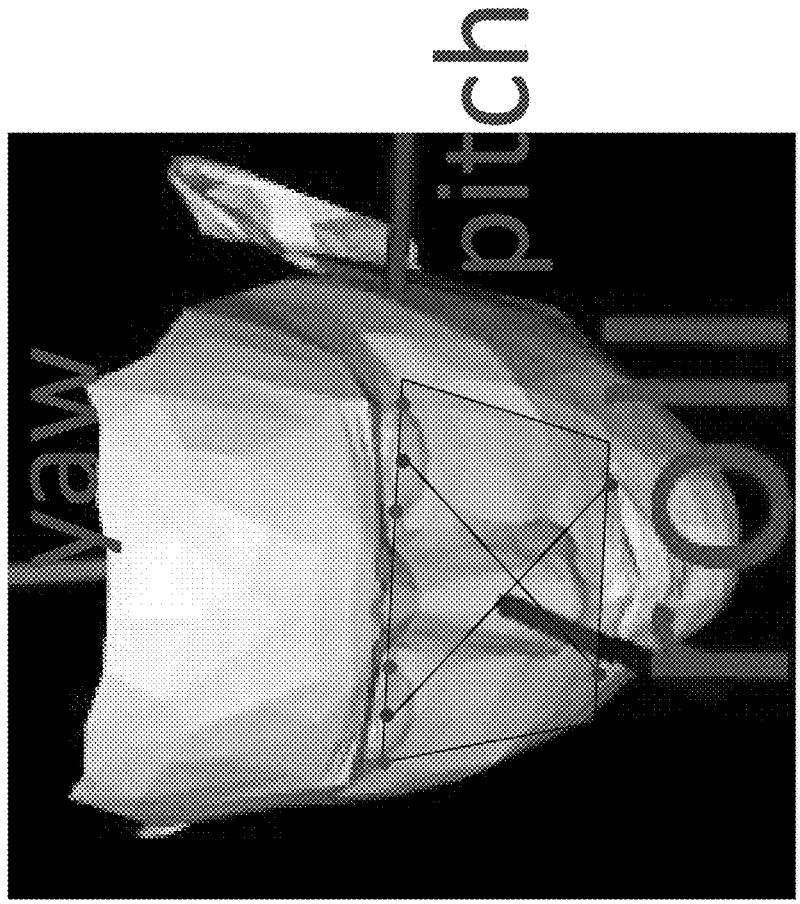
FIG. 10B is an illustration showing an image onto which the facial plane is marked in order to show the roll of the face from the center of the facial plane

$T_{si}$ represents the tilt-rotation transformation in the (y,z) plane, that is, $$T_{si} = \begin{bmatrix} 1 & 0 & 0 \\ 0 & \cos\psi & \sin\psi \\ 0 & -\sin\psi & \cos\psi \end{bmatrix}, \quad (5)$$

where θ, φ, and ψ are the angles of in-plane, pose, and tilt rotations, respectively, as shown in FIGS. 2, 10A, 10B.

For a 2-D face image, the coordinates of each landmark result in z=0 for the UCS domain. For the coordinates of each landmark in the measurement domain, the r is not available. The measureable coordinates of a landmark in the measurement domain are denoted as $P_{Mn,2}=[u,v]^t$, t represents the transpose operator.

From equation (1), in order to estimate the transformation that transforms a face image into the UCS, ten parameters are estimated in the UCS domain, which are defined as a parameter vector:

$$V_p = (x_{e1}, y_{e1}, x_{e2}, y_{e2}, x_m, y_m, \theta, \phi, \psi, \alpha)^t. \quad (6)$$

The coordinates of each landmark in a face image can be represented by this parameter vector, $V_p$, as shown in (1). The coordinates of each face landmark can also be obtained by measurements from the face image, which is denoted as $\overline{P}_{Mn,2}=[\overline{u},\overline{v}]^t$, n=1,2, . . . ,6.

For a face image, 6 landmarks are used in the measurement domain which results 6 pairs of (u,v) values. Therefore, 12 equations can be formed from equation (1) to estimate 10 parameters in (6).

The aim is to make the difference between the measurement coordinates and the estimated coordinates of face landmarks minimal. That is, $$\min|\overline{P}_{Mn,2} - P_{Mn,2}|. \quad (7)$$

In the following, minimization problem is formulated into a cost function via a procedure that we developed in S. S Young, "Optimized target localization in stereotactic radiosurgery using real-time digital portal images," Phys. Med. Biol. Vol. 41, pp. 1621-1632, 1996. In this way, the estimate of ten parameters minimizes the cost function.

Define $V_p$ as the parameter vector, $$V_p = (x_{e1}, y_{e1}, x_{e2}, y_{e2}, x_m, y_m, \theta, \phi, \psi, \alpha)^t. \quad (8)$$

The function F, which is the function of the parameter vector $V_p$, can be defined as $$F = f(V_p) \quad (9)$$

where $$F = (F_1, \ldots, F_{12})^t \quad (10)$$

$$f(V_p) = (f_1(V_p), \ldots, f_{12}(V_p))^t \quad (11)$$

$$F_k = \begin{cases} F_{2n-1} = \overline{P}_{Mn,2}(1) = \overline{u}, & k = \text{odd value} \\ F_{2n} = \overline{P}_{Mn,2}(2) = \overline{v}, & k = \text{even value} \end{cases} \quad (12)$$

-continued $$f_k(V_p) = \begin{cases} f_{2n-1}(V_p) = P_{Mn,2}(1) = u, & k = \text{odd value} \\ f_{2n}(V_p) = P_{Mn,2}(2) = v, & k = \text{even value} \end{cases} \quad (13)$$

where $P_{Mn,2}(1)=u$ and $P_{Mn,2}(2)=v$ are calculated from equation (1) using the parameter vector $V_p$, and n=1, . . . ,6 represent 6 landmarks and k=1, . . . ,12 represent 12 equations that are resulted from 6 landmark measurements. The measurements $\overline{P}_{Mn,2}(1)=\overline{u}$ and $\overline{P}_{Mn,2}(1)=\overline{u}$ may be obtained from the inquiring face image by a user mouse interface or by using any of the facial landmark detection algorithms.

The goal is to find an estimate of $V_p$, denoted as $\tilde{V}_p$. This estimate minimizes $$|F - f(\tilde{V}_p)|. \quad (14)$$

To estimate ten parameters $V_p = (x_{e1}, y_{e1}, x_{e2}, y_{e2}, x_m, y_m, \theta, \varphi, \psi, \alpha)^t$, a non-linear least square algorithm, such as the Gaussian least square differential correction (GLSDC) can be applied. The function F can be approximated by $$\Delta F \approx \left(\frac{\partial f}{\partial V_p}\right) \Delta V_p. \quad (15)$$

If $\Delta F$ is given, then $\Delta V_p$ can be found as follows:

$$\Delta V_p = \left[\left(\frac{\partial f}{\partial V_p}\right)^t \left(\frac{\partial f}{\partial V_p}\right)\right]^{-1} \left(\frac{\partial f}{\partial V_p}\right)^t \Delta F. \quad (16)$$

The algorithm can be summarized in the following. FIG. 8 illustrates a schematic representation of this algorithm, which may comprise:

Step (1) Input measurements F (Box 200).
Step (2) Initialize the parameter vector (Box 210)

$$V_p = (x_{e1}, y_{e1}, x_{e2}, y_{e2}, x_m, y_m, \theta, \varphi, \psi, \alpha)^t. \quad (17)$$

Step (3) Calculate the estimated coordinate $P_{Mn,2} = f(V_p)$ using (13). (Box 220)
Step (4) Calculate $\Delta F = F - f(V_p)$ (Box 230).
Step (5) Calculate the estimate correction vector $\Delta V_p$ using (16) (Box 240).
Step (6) Update the parameter vector $V_p = V_p + \Delta V_p$ (Box 250).
Step (7) Stop iteration if $\Delta F$ does not change significantly from one iteration to another (Box 260), otherwise go to step (4).
Step (8) Output the estimated parameter vector $V_p$ (Box 270).

Figure 7:
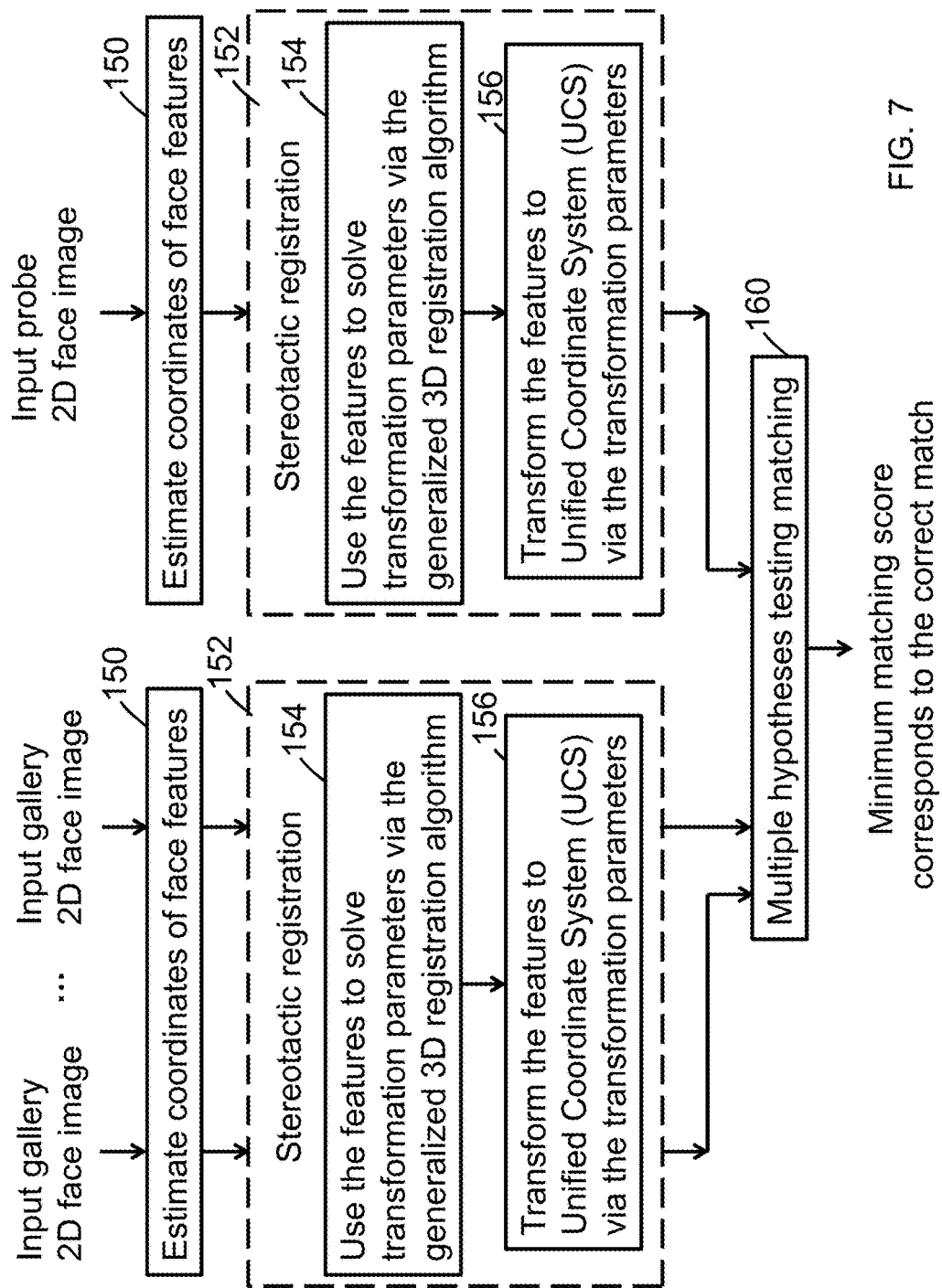
FIG. 7 is an overall schematic representation of a preferred embodiment of the present invention for identifying a personnel target when the probe image and gallery image are in different modalities and face images having 3D pose angles due to the fact that they are acquired from different sensors and/or at different times.

Referring now to FIG. 6, a flow chart of the overall preferred embodiment system is shown, which contains 3 modules (44A, 44B), 45 and 46. The thermal test image and visible reference image are input to the Module I (Boxes 45A, 45B). Module I estimates coordinates of features for both thermal test image and visible reference image. These are biometric landmarks of the human face, such as eyes, nose, mouth, ears, etc. Visible and thermal images are acquired from different sensors, and are first registered. Module II (Box 45) performs registration based on those features, or sub-set of those features. For example, when the ear features are available, the algorithm uses features including ears. When the ear features are not available, the algorithm uses the sub-set of features that exclude ears. The algorithm takes available and reliable features and performs the constraint optimization using those features. The registration transformation includes shifts, 3D rotations, and scale. Module III (Box 46) performs the matching based on multiple hypotheses testing theory, which uses the features other than edges to correlate the visible and thermal face images FIG. 7 shows another preferred embodiment of the invention. Assume the gallery contains multiple 2D face images. Each of them is input to algorithm of the estimate coordinates of face features (Box 150). After this, the face features corresponding to each face are input to the stereotactic registration (Box 152). In the step of stereotactic registration, the transformation parameters of features of each face are estimated via the generalized 3D registration algorithm (Box 154). Then the features of each face are transformed to the common coordinate system, the unified coordinates system (UCS) (Box 156), which is defined in details in the section of Stereotactic Registration. The 2D face image in the probe is also input to the algorithm of the estimate coordinates of face features (Box 150). Then, the features of the probe face are passed into the stereotactic registration step (Box 152). The probe face features are also transformed into the UCS domain (Box 156). Now, both transformed gallery face features and probe face features are input to the multiple hypotheses testing matching (Box 160). The matching algorithm generates the matching scores of the probe face with each face in the gallery. The minimum matching score corresponds to the correct match.

Many algorithms are available for finding available coordinates of face features. In this invention, the stereotactic registration (Box 45) and the stereotactic-based matching (Box 46) are described in the following.

Stereotactic Registration

When a face image is acquired under an un-cooperative condition, the face image can contain three rotations, such as, in-plane, pose, and tile rotations as shown in FIG. 10A. The common terms of roll, jaw, and pitch can be used to describe these three rotations as illustrated in FIG. 10A.

In order to match face images that are taken by different sensors and at different times, the face images from gallery and probe need to be transformed into a common coordinate system. This common coordinate system should be invariant to the sensor position with respect to the human subject when the face image is taken. In another word, this common coordinate system should be invariant of relative pose of the human head.

The following describes, a method of a generalized yaw, pitch, roll, scale, and shift transformation to a unified coordinate system (UCS) via a single frame.

Unified Coordinate System (UCS)

Before describing the UCS, a human face is described in three dimensions. Looking at a side view of a human face, there is a depth from eyes to mouth. This depth is unique for each person. Therefore, for a normal posed human head, which is normally termed as a frontal pose, the centers of corners of each eye and the corners of mouth are on two different vertical planes.

Using a unified coordinate system (UCS), four points on a human face are labelled.

This face plane is different from the Face Plane that was used in U.S. Pat. No. 7,221,809, "Face recognition system and method," May 22, 2007, Z. J. Geng. The face plane that is used in the conjunction with a preferred embodiment of the present invention is the plane that passes through centers of two eyes and outer corners of mouth and is vertical. The Face Plane that was used in U.S. Pat. No. 7,221,809 was the plane that passed through centers of two eyes and outer corners of mouth but was not defined as vertical. And it also used the location of the nose tip to derive the pan (title) angle. Usually, it is difficult to locate the nose tip accurately. In accordance with the current invention, use of the nose tip is avoided.

This Unified Coordinate System nomenclature is unique for each person. That is, it is invariant in coordinates of the sensor with respect to the person, and relative pose of the human head. A face image is transformed from any other position into the UCS. Then the face recognition or face matching is performed in this UCS. The matching could be between any desired features.

Since face images at any other positions with possible three rotation angles are transformed into the Unified Coordinate System, the face recognition problem can be addressed with un-cooperative or uncontrolled conditions where face images have 3D rotational angles; allowing the address un-cooperative face recognition based on one single 2D frame via performing the generalized yaw, pitch, roll, scale, and shift transformation to a unified coordinate system (UCS).

Shift is related to the relative position of the object to the center of the image plane. Scale is related to the object range and sensor focal plane properties (number of pixels, element spacing, etc.) Yaw, pitch, and roll are related to the pose rotation, head tilt rotation and in plane rotation.

Generalized Yaw, Pitch, Roll, Scale, and Shift Transformation to a Unified Coordinate System (UCS) via a Single Frame The face plane under the UCS is illustrated in FIG. 10B. Assume a face is symmetric with respect to a center line, $L_c$, as shown in FIG. 10B.

In the face plane of the Unified Coordinate, the eye corners and mouth corners are in a same vertical plane where z=0. There are 6 primary points, or landmarks, to describe a face; i.e., the outer corners of two eyes, inner corners of two eyes, and corners of mouth.

Figure 11:
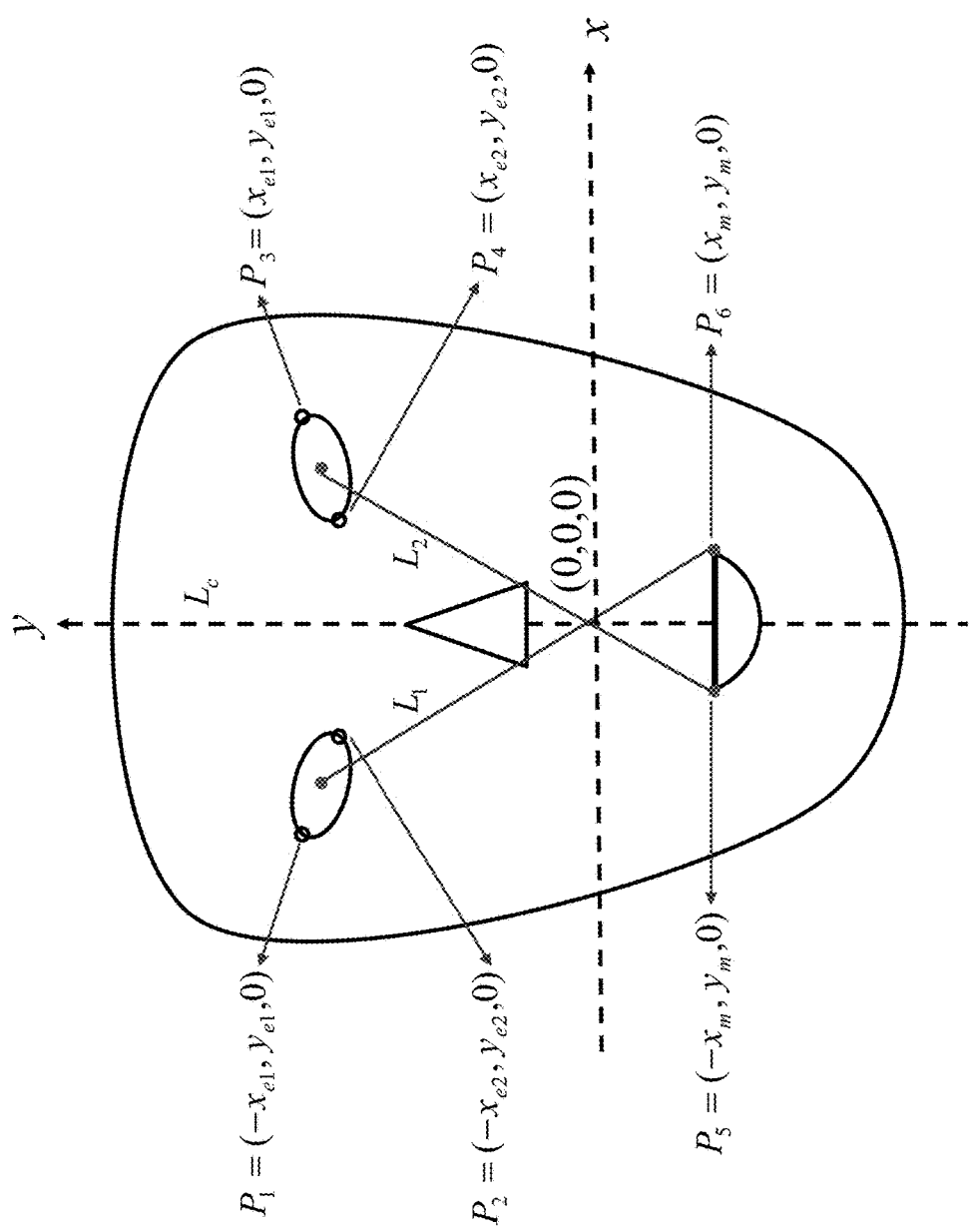
FIG. 11 is a schematic representation of a mask labelled with the fiducial points or facial features of the eye corners and mouth cornets. Lines L1 and L2 define an origin (at the intersection).

The origin point O (0,0,0) of the face plane is defined as the intersection of two lines $L_1$ and $L_2$, as shown in FIG. 11. The line $L_1$ connects the center of two corners of left eye and the right corner of mouth. The line $L_2$ connects the center of two corners of right eye and the left corner of mouth.

Since these 6 primary points are symmetric with respect to the center line $L_c$, there are 6 parameters to define the face plane. They are $(x_{e1}, y_{e1}, x_{e2}, y_{e2}, x_m, y_m)$, where $x_{e1}$ and $y_{e1}$ represent the outer corners of two eyes, $x_{e2}$ and $y_{e2}$ represent the inner corners of two eyes, $x_m$ and $y_m$ represent the corners of mouth, as shown in FIG. 11.

Therefore, these 6 primary points are presented in a three dimensional space as follows.

The left eye outer corner is represented by $P_1=(-x_{e1}, y_{e1}, 0)$. The left eye inner corner is represented by $P_2=(-x_{e2}, y_{e2}, 0)$. The right eye outer corner is represented by $P_3=(x_{e1}, y_{e1}, 0)$. The right eye inner corner is represented by $P_4=(x_{e2}, y_{e2}, 0)$. The left mouth corner is represented by $P_5=(-x_m, y_m, 0)$ and the right mouth corner is $P_6=(x_m, y_m, 0)$. These parameters are obtained via a minimization procedure by solving the equation (7).

Stereotactic-Based Matching

Figure 12:
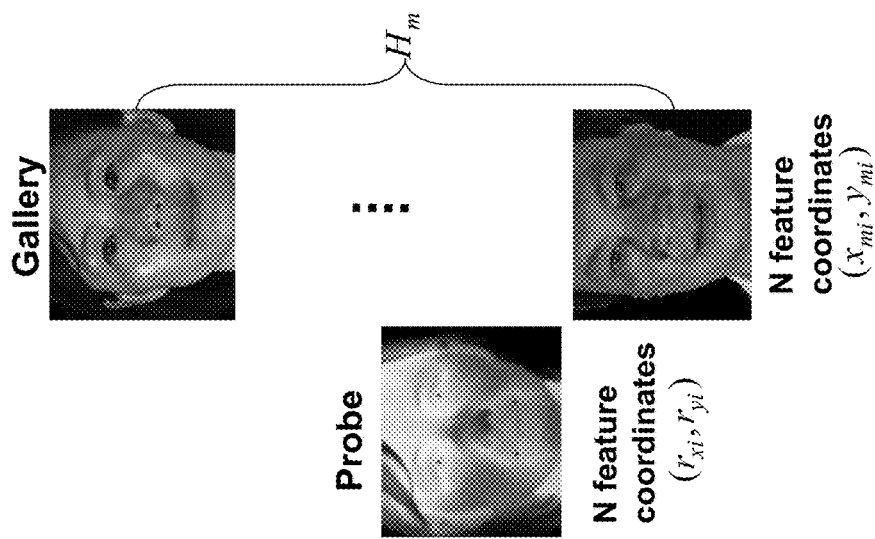
FIG. 12 illustrates a graphic view showing the stereotactic-based matching that is formulated as a multiple hypotheses testing.

After the facial features are transformed into the UCS, matching can be performed. In the approach of stereotactic-based matching, the matching problem is formulated as a multiple hypotheses testing as illustrated in FIG. 12.

Multiple Hypotheses Testing

In this multiple hypotheses testing formation, we will present the gallery model, the probe model, and the decision rule.

Gallery Model

As shown in FIG. 12, the gallery contains Mface images that belong to Msubjects. In the gallery model, the gallery is denoted by a set of Mhypotheses, $$H_m, m=1,2,\ldots,M \qquad (18)$$

with a prior probability $$P_m=\text{Prob(Gallery generating } H_m) \qquad (19)$$

Probe Model:

The probe contains the test face image. The probe observation vector, R, contains N landmark coordinates $(r_{xi}, r_{yi})$, that is, $$\vec{R}=[r_{x1}r_{y1},\ldots r_{xN}r_{yN}] \qquad (20)$$

The coordinates of landmarks of the gallery are denoted as $(x_{mi}, y_{mi})$ as shown in FIG. 12. The coordinates from the probe image and the gallery image are related by some noise, this noise is assumed under the added white Gaussian noise model, called AWGN model. Therefore, it follows that $$r_{xi}=x_{mi}+n_{xi},\ r_{yi}=y_{mi}+n_{yi},\ i=1,2,\ldots N \qquad (21)$$

where $n_{xi}$'s and $n_{yi}$'s are independent identically distributed (iid) normal or Gaussian random variables with zero mean and variance $\sigma_n^2$, respectively, that is, $$E(n_{xi})=0,\ E(n_{xi}^2)=\sigma_n^2,\ E(n_{yi})=0,\ E(n_{yi}^2)=\sigma_n^2. \qquad (22)$$

Then, the conditional probability in which the probability of the observation vector given the gallery generating $H_m$ is represented as follows, DECISION RULE:
$$[P(\vec{R}/H_m)] = \frac{1}{(\sqrt{2\pi}\,\sigma_n)^{2N}} \exp\left[\frac{-\sum_{i=1}^{N}(r_{xi}-x_{mi})^2 + (r_{yi}-y_{mi})^2}{2\sigma_n^2}\right]. \qquad (23)$$

Under the above model, the multiple hypotheses testing theory allows the development of the decision rule as shown in the following:

$$p(\vec{R}/H_k) \mathop{\gtrless}_{<notH_k}^{>notH_m} p(\vec{R}/H_m) \qquad (24)$$

or $$\max_m [p(\vec{R}/H_m)]. \qquad (25)$$

By manipulating the equation in (23), it follows that $$\min_m \sum_{i=1}^{N}(r_{xi}-x_{mi})^2 + (r_{yi}-y_{mi})^2. \qquad (26)$$

In summary, the decision rule is to calculate the minimum value according (26) among Msubjects in the gallery. The subject m that results the minimum value in equation (26) is claimed as the right match to the test subject. The theory of multiple hypotheses testing shows that the cost function of this decision rule in equation (26) is optimal to minimize probability of error under the AWGN measurement model.

EXAMPLE

Figure 13:
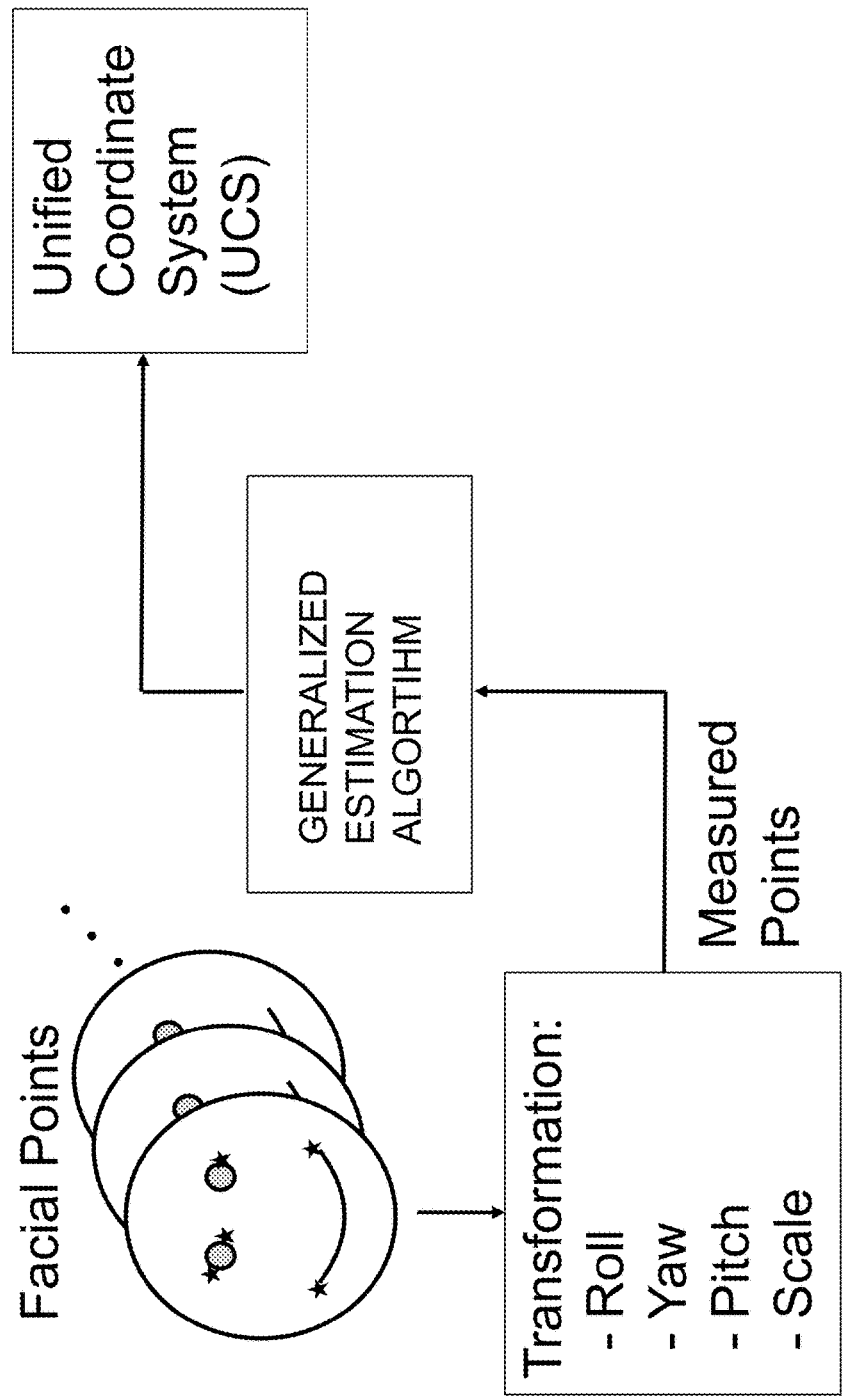
FIG. 13 illustrates a graphic view showing the procedure of simulating varying 3D posing angles.
Figure 14:
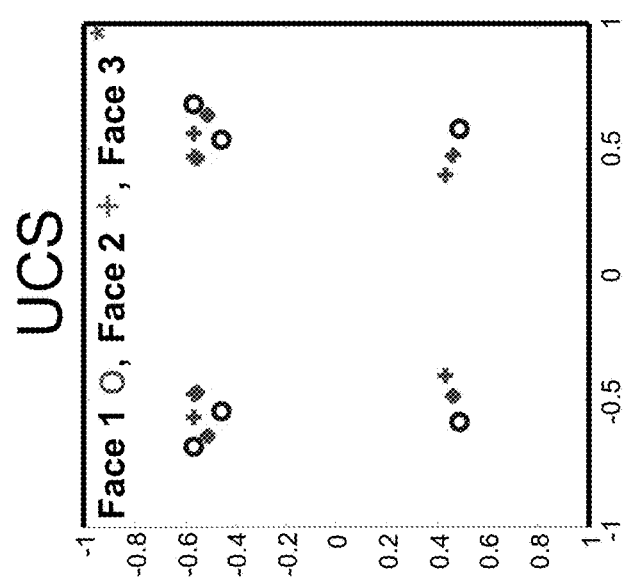
FIG. 14 shows an example where facial points of three real faces are displayed in the UCS.

FIG. 13 illustrates a simulation of varying 3D posing angles. The procedure is shown in this figure. The facial landmarks are obtained from several faces. These facial landmark points are input to a transformation with roll, pitch, yaw and scale. The outputs are our measured facial points. Now, these measured points pass into our generalized 3D estimation algorithm to transform to the unified coordinate system (UCS). FIG. 14 shows an example where facial points of three real faces are displayed in the unified coordinate system (UCS).

Figure 15:
FIG. 15 shows face images with various pose views.
Figure 16:
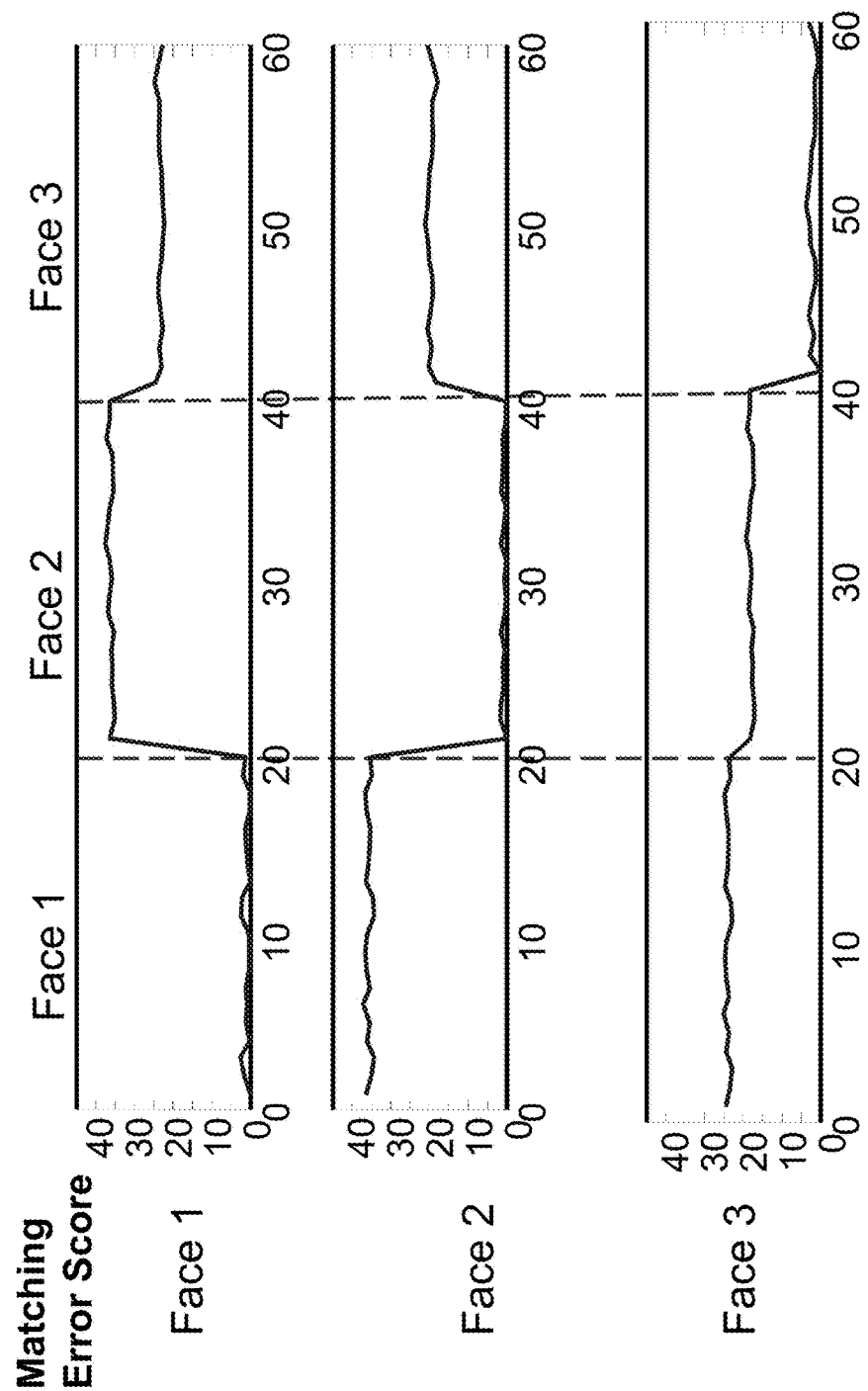
FIG. 16 shows the results of simulating 3D pose angles between −10 to 10 degrees.
Figure 17:
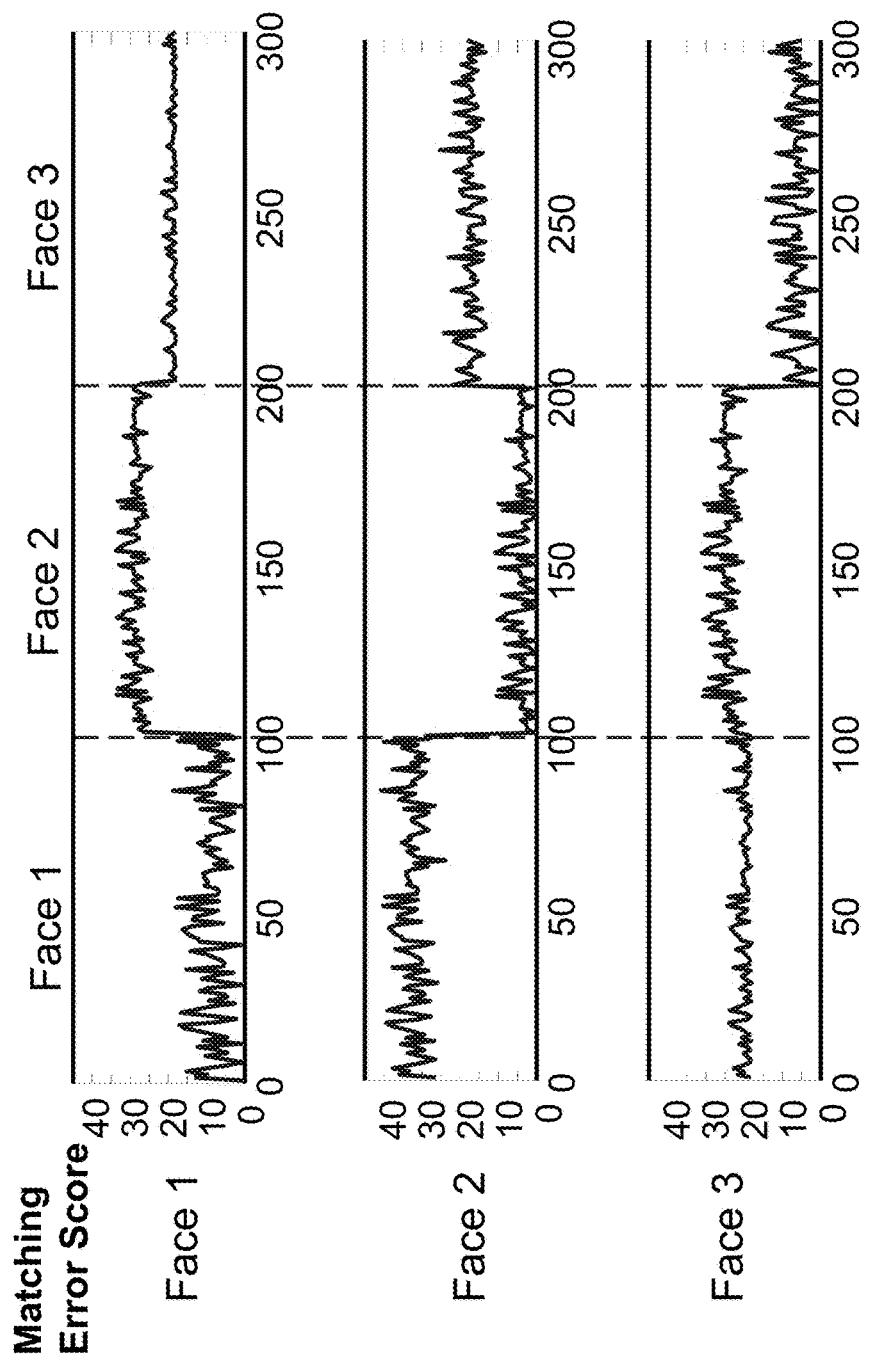
FIG. 17 shows the results of simulating 3D pose angles between −20 to 20 degrees.

FIG. 15 shows face images with various pose views. It illustrates that two corners of eyes are not visible beyond 30° pose view. FIGS. 16 and 17 show the results of simulating 3D pose angles that are below 30 degrees.

FIG. 16 shows the results of simulating 3D pose angles between −10 to 10 degrees. 20 random angles between −10 to 10 degrees were chosen to obtain the face with 20 different poses. The first 20 points (from 1 to 20) on the horizontal axis represent 20 cases of face 1. The next 20 points (from 21 to 40) represent 20 cases of face 2. From 41 to 60 are 20 cases of face 3. The vertical axis is the matching error score. The small score represents the correct matching. From FIG. 16, it can be seen that, even with different pose angles, the scores of matching the face with its own face are much smaller than ones of the face matching with other faces.

FIG. 17 shows the results of simulating 3D pose angles between −20 to 20 degrees. 100 cases were attempted for each face. On the horizontal axis, 1 to 100 are for face 1; 101 to 200 are for face 2; 201 to 300 are for face 3. Again, the results in FIG. 17 show that the face matches its own face and not matches other faces.

Figure 18:
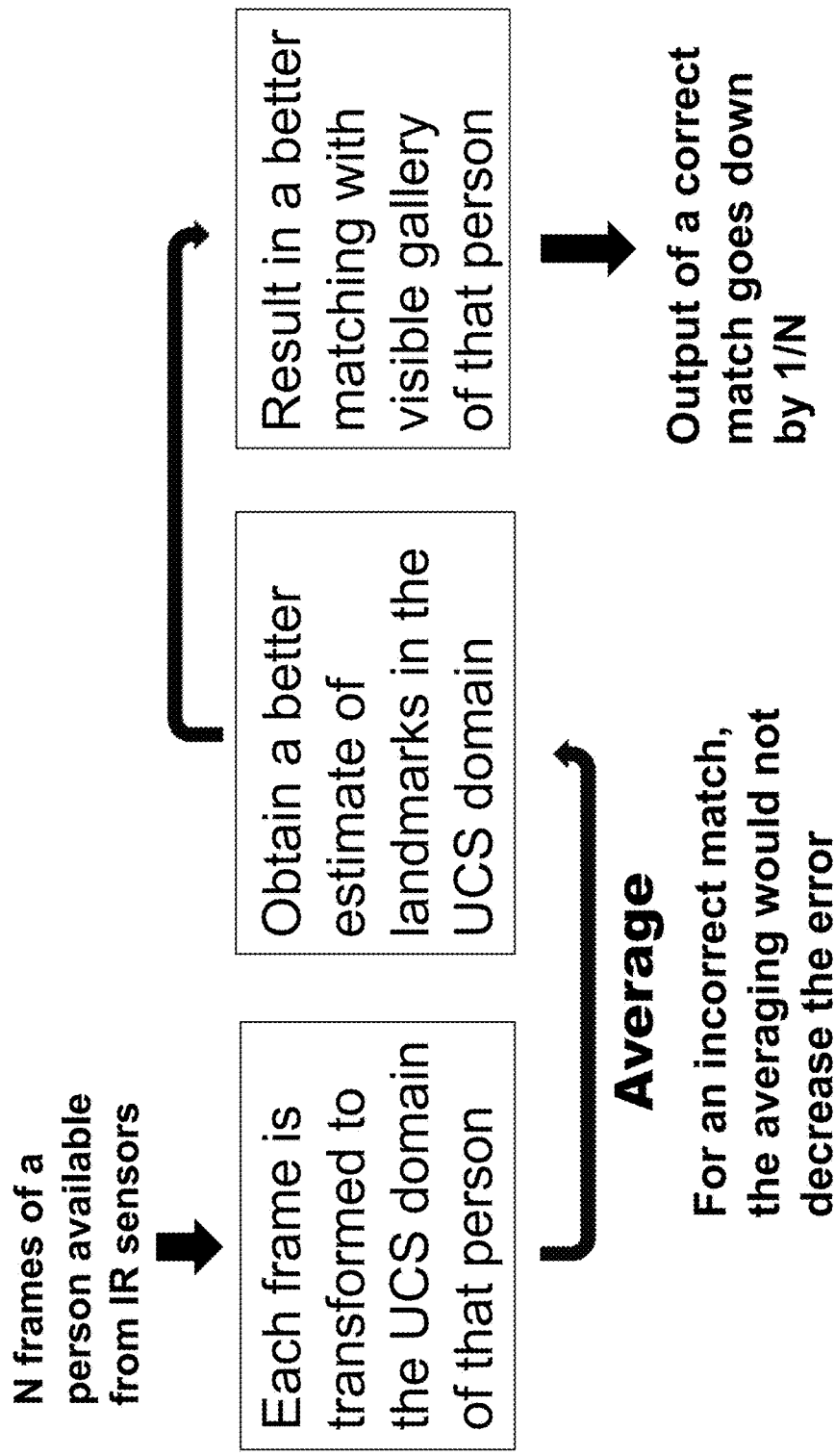
FIG. 18 is an illustration schematically illustrating that matching can be implemented by exploring multiple frames through temporal information.

In the present invention, the stereotactic matching can be implemented by exploring multiple frames through temporal information as shown in FIG. 18.

Since many sensors can capture a video of a person, each of these frames can be transformed into the UCS domain of that person. The data can be averaged to obtain a better estimate of the coordinates of the landmarks in the UCS domain. This results in a better matching score of that person since the output error of a correct match goes down by 1/M where M is the number of temporal images used. Meanwhile, for an incorrect match, the averaging would not decrease the error since there is still a mismatch.

Figure 19:
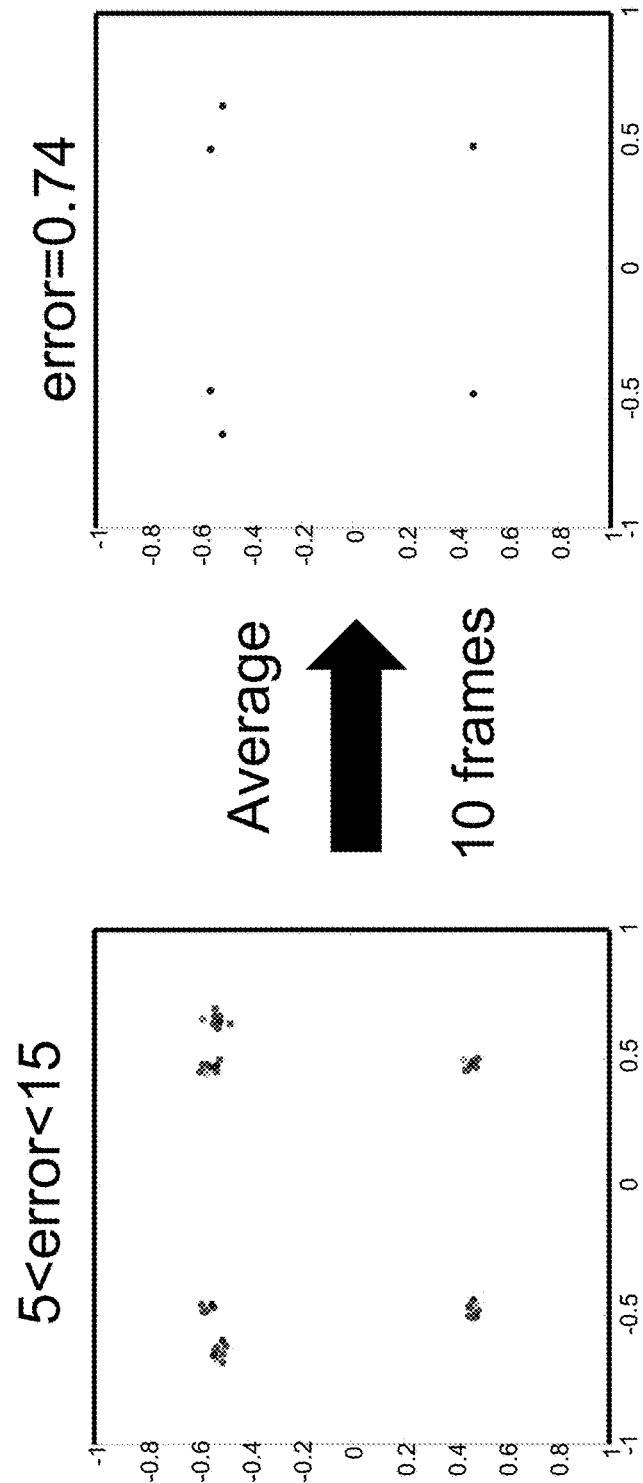
FIG. 19 shows when 10 frames are used, the matching error is reduced to 0.74 from the error range between 5 and 10.

FIG. 19 shows that when 10 frames are used, the matching error is reduced to 0.74 from the error range between 5 and 10.

Figure 20:
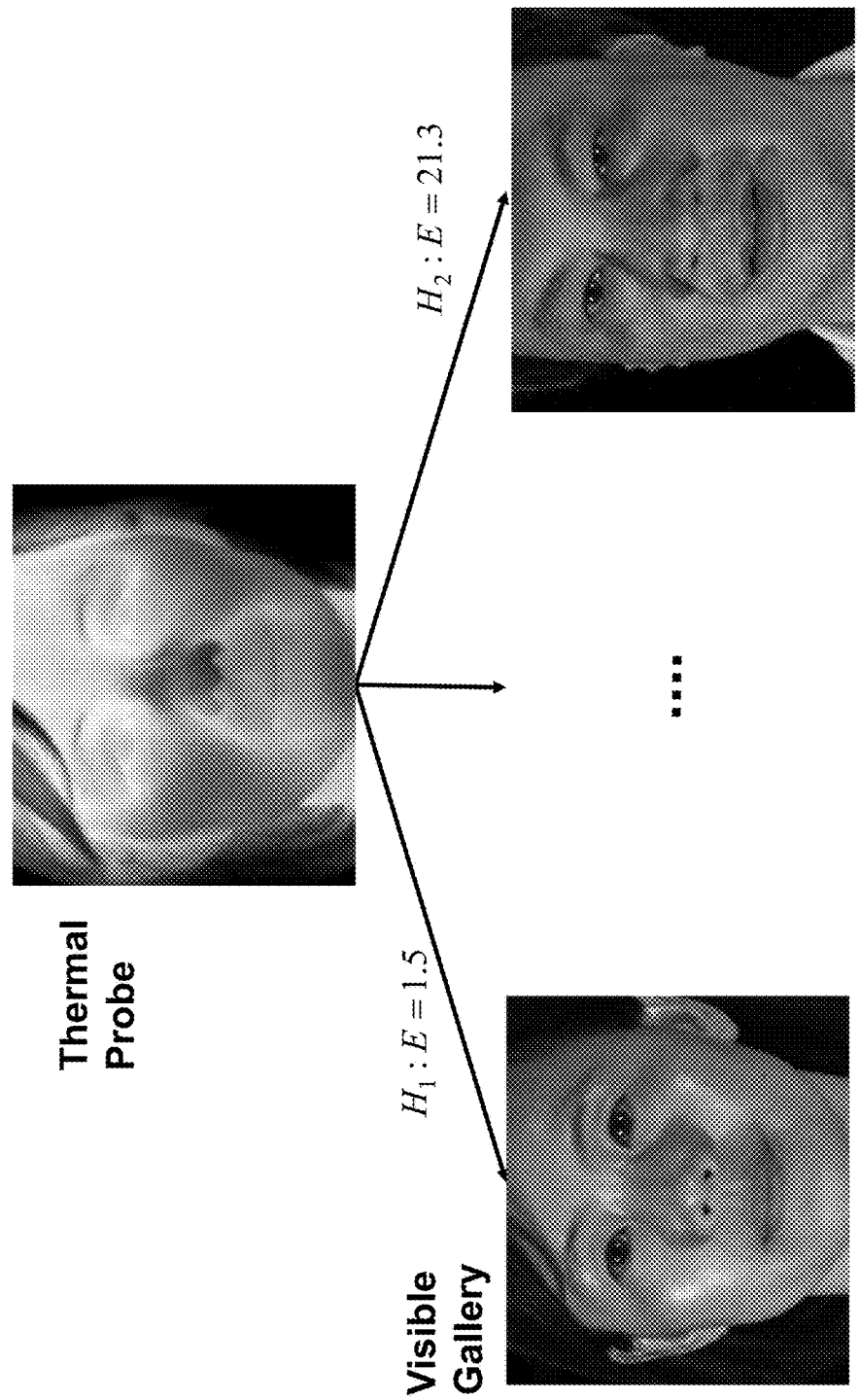
FIG. 20 illustrates matching result of one thermal probe face to two visible gallery faces.

FIG. 20 illustrates a matching result of matching one thermal probe face image to two visible gallery images. The matching scores are displayed for the probe face with each face in the gallery. The smallest score corresponds to the correct matching.

Figure 22:
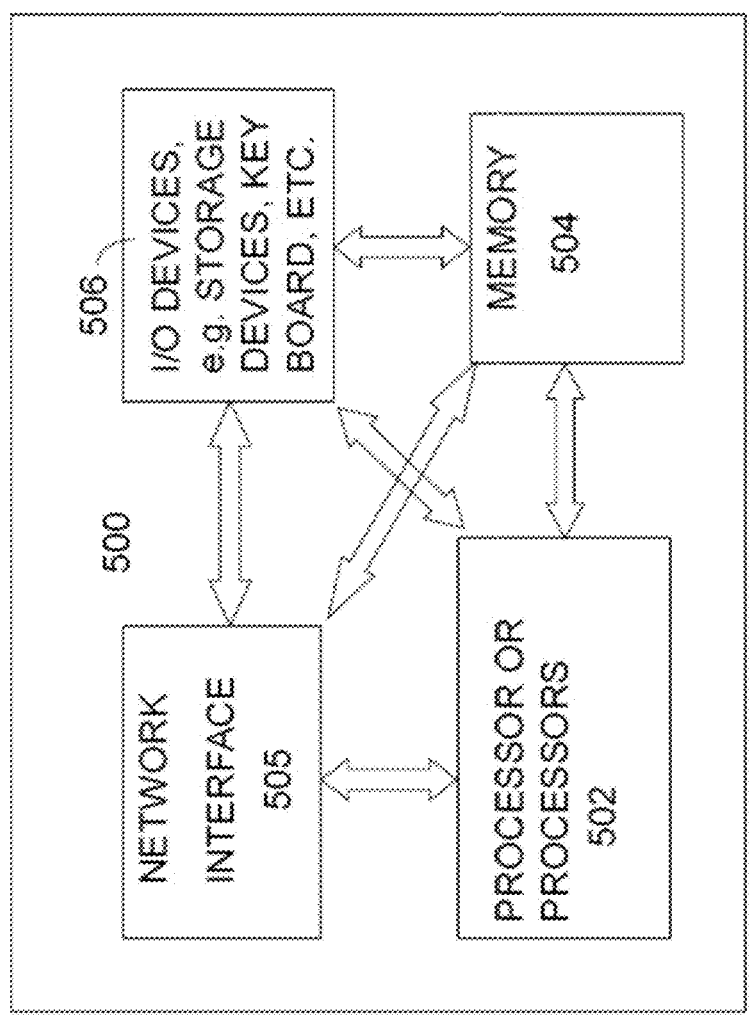
FIG. 22 depicts a high level block schematic diagram of a general purpose computer.

FIG. 22 depicts a high level block diagram of a general purpose computer suitable for use in performing the functions described herein, including the steps shown in the block diagrams, schematic representations, and/or flowcharts. As depicted in FIG. 22, the system 500 includes a processor element 502 (e.g., a CPU) for controlling the overall function of the system 500. Processor 502 operates in accordance with stored computer program code, which is stored in memory 504. Memory 504 represents any type of computer readable medium and may include, for example, RAM, ROM, optical disk, magnetic disk, or a combination of these media. The processor 502 executes the computer program code in memory 504 in order to control the functioning of the system 500. Processor 502 is also connected to network interface 505, which transmits and receives network data packets. Also included are various input/output devices 506 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Although various preferred embodiments of the present invention have been described herein in detail to provide for complete and clear disclosure, it will be appreciated by those skilled in the art, that variations may be made thereto without departing from the spirit of the invention.

As used herein the terminology yaw means movement of a subject to the left or right.

As used herein the terminology "pitch" means the tilting of the subject's head on the y axis.

As used herein the terminology "roll" means the in plane rotation on the z-axis.

As used herein, virtual neutral pose position or virtual vertical plane position is defined as when the head is facing the camera or image producer and tilting such that the midpoints of the eyes and corners of the mouth are on a vertical plane and the corners of the eyes and corners of the mouth are equally distant from a face center line (as shown in FIG. 11).

It should be emphasized that the above-described embodiments are merely possible examples of implementations. Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention.

The invention claimed is:

1. A system for facial recognition using an image of a human in which the eyes and mouth corners are not in a vertical plane when the image was taken to determine estimated virtual plane coordinates corresponding to estimated location of eyes and mouth corners of the human when the eyes and mouth corners are in a vertical plane; the system comprising:

at least one processor configured to determine the virtual plane coordinates;

at least one input operatively connected to the at least one processor and configured to input the first corners of the eyes and mouth coordinates $F_1, F_2, F_3, F_4, F_5, F_6, F_7, F_8, F_9, F_{10}, F_{11}, F_{12}$ from the image into the at least one processor comprising data points in a vector $$F=(F_1, \ldots, F_{12})^t$$

where t represents the transpose, $F_1$ represents the horizontal coordinate of the left eye outer corner, $F_2$ represents the vertical coordinate of the left eye outer corner, $F_3$ represents the horizontal coordinate of the left eye inner corner, $F_4$ represents the vertical coordinate of the left eye inner corner, $F_5$ represents the horizontal coordinate of the right eye outer corner, $F_6$ represents the vertical coordinate of the right eye outer corner, $F_7$ represents the horizontal coordinate of the right eye inner corner, $F_8$ represents the vertical coordinate of the right eye inner corner, $F_9$ represents the horizontal coordinate of the left mouth corner, $F_{10}$ represents the vertical coordinate of the left mouth corner, $F_{11}$ represents the horizontal coordinate of the right mouth corner, and $F_{12}$ represents the vertical coordinate of the right mouth corner;

the at least one processor configured to convert the first coordinates $F_1$, $F_2$, $F_3$, $F_4$, $F_5$, $F_6$, $F_7$, $F_8$, $F_9$, $F_{10}$, $F_{11}$, $F_{12}$ into second coordinates for the corners of the eye and mouth in a virtual vertical plane comprising $P_1=(-x_{e1},y_{e1},0)$, $P_2=(-x_{e2},y_{e2},0)$, $P_3=(x_{e1},y_{e1},0)$, $P_4=(x_{e2},y_{e2},0)$, $P_5=(-x_m,y_m,0)$, and $P_6=(x_m,y_m,0)$, where $P_1$ is the estimated left eye outer corner coordinates, $P_2$ is, the estimated left eye inner corner coordinates, $P_3$ is the estimated right eye outer corner coordinates, $P_4$ is the estimated right eye inner corner coordinates, $P_5$ is the estimated left mouth corner coordinates and $P_6$ is the estimated right mouth corner coordinates and x and y represent horizontal and vertical distances from a facial reference point, and to determine the head orientation of the human subject using roll, yaw and pitch relative to the virtual vertical plane where, θ represents the yaw, φ represents the pitch, and ψ represents the roll;

the at least one processor configured to solve for the parameter vector $V_p$ comprising 9 parameters $x_{e1}$, $y_{e1}$, $x_{e2}$, $y_{e2}$, $x_m$, $y_m$, θ, φ, ψ using the following equation:

$$V_p = (x_{e1}, y_{e1}, x_{e2}, y_{e2}, x_m, y_m, \theta, \varphi, \psi)^t$$

where $x_{e1}$, $y_{e1}$, $x_{e2}$, $y_{e2}$, $x_m$, $y_m$, represent the virtual plane coordinates of the corners of the eyes and mouth in the vertical virtual plane, and wherein the error to be minimized is the error between the inputted corners of the eyes and mouth coordinates $F_1$, $F_2$, $F_3$, $F_4$, $F_5$, $F_6$, $F_7$, $F_8$, $F_9$, $F_{10}$, $F_{11}$, $F_{12}$ and the least square estimation model function $f(V_p)$ coordinates of the estimated inputted corners of the eyes and mouth coordinate values comprising horizontal coordinates $f_1(V_p)$, $f_3(V_p)$, $f_5(V_p)$, $f_7(V_p)$ $f_9(V_p)$, $f_{11}(V_p)$, and vertical coordinates $f_2(V_p)$, $f_4(V_p)$, $f_6(V_p)$, $f_8(V_p)$, $f_{10}(V_p)$, $f_{12}(V_p)$ and where the least square model function $f(V_p)$ is computed using $f_1(V_p) = [1,0,0]T\ P_1$
$f_2(V_p) = [0,1,0]T\ P_1$
$f_3(V_p) = [1,0,0]T\ P_2$
$f_4(V_p) = [0,1,0]T\ P_2$
$f_5(V_p) = [1,0,0]T\ P_3$
$f_6(V_p) = [0,1,0]T\ P_3$
$f_7(V_p) = [1,0,0]T\ P_4$
$f_8(V_p) = [0,1,0]T\ P_4$
$f_9(V_p) = [1,0,0]T\ P_5$
$f_{10}(V_p) = [0,1,0]T\ P_5$
$f_{11}(V_p) = [1,0,0]T\ P_6$
$f_{12}(V_p) = [0,1,0]T\ P_6$ where T correlates to the head orientation θ, φ, ψ and the matrix $T = T_\theta \cdot T_\varphi \cdot T_\psi$
where $$T_\theta = \begin{bmatrix} \cos\theta & \sin\theta & 0 \\ -\sin\theta & \cos\theta & 0 \\ 0 & 0 & 1 \end{bmatrix}$$

$$T_\phi = \begin{bmatrix} \cos\phi & 0 & \sin\theta \\ 0 & 1 & 0 \\ -\sin\phi & 0 & \cos\phi \end{bmatrix}$$

$$T_\psi = \begin{bmatrix} 1 & 0 & 0 \\ 0 & \cos\psi & \sin\psi \\ 0 & -\sin\psi & \cos\psi \end{bmatrix},$$

whereby the virtual plane coordinates are used to search a database of a plurality of images of people represented by either virtual plane or vertical plane coordinates in order to identify or recognize an individual.

2. The system of claim 1 wherein the virtual plane correlates to a plane having zero values for the yaw, pitch, and roll.

3. The system of claim 1 wherein if the subject of the image is photographed when the eyes and mouth coordinates are in a vertical plane, the vertical plane coordinates inputted into the database directly from the image.

4. The system of claim 1 wherein the plurality of images of people comprise suspected individuals, persons convicted of crimes, driver's license images of general public, criminal detection, airline screening, access control, surveillance system, identification of dead bodies, terrorist watch list, and wherein each image is represented using virtual or vertical plane coordinates of the corners of the eyes and mouth for each image in the gallery.

5. The system of claim 1 wherein the image of a human correlates to a probe and wherein the database comprises targeted individuals and wherein the virtual plane coordinates are used to determine vertical plane coordinates of the corners of the eyes and mouth of the image in the probe.

6. The system of claim 1 wherein the virtual plane coordinates of the corners of the eyes and mouth of the image of a human are matched against a gallery of virtual or vertical plane coordinates of the corners of eyes and mouths to generate the matching scores and to determine a minimum match score to determine a match.

7. The method of claim 6 wherein the matching is based on the multiple hypotheses testing with the risk function of minimizing the probability of error of a matching result and comprises calculating the matrix distances between the probe vertical or virtual plane coordinates of the corners of the eyes and mouth and each gallery vertical or virtual plane coordinates of the corners of the eyes and mouth to generate matching scores.

8. The system of claim 1 wherein the at least one processor is configured to solve for the parameter vector $V_p$ using the non-linear Gaussian Least Square Differential Correction algorithm, the at least one processor being configured to perform repeated iterations comprising first determining whether to update the vector $V_p$ by calculating $\Delta F = F - f(V_p)$ to calculate the change of an estimated least square estimation model function relative to the actual values F, and then using the equation $$\Delta V_p = \left[\left(\frac{\partial f}{\partial V_p}\right)^t \left(\frac{\partial f}{\partial V_p}\right)\right]^{-1} \left(\frac{\partial f}{\partial V_p}\right)^t \Delta F$$

to calculate the estimate correction vector $\Delta V_p$; wherein for each iteration the parameter vector is updated using $V_p = V_p + \Delta V_p$ and wherein the iteration continues until $\Delta F$ is less than a pre-determined threshold at which point the iteration is stopped and the estimated parameter vector $V_p$ is outputted.

9. A system for facial recognition in which facial images in a database are defined by facial coordinates in a plane common to other images in order to facilitate comparison or likeness of the facial images:

at least one input operatively connected to the at least one processor and configured to input the corners of the eyes and mouth coordinates $F_1$, $F_2$, $F_3$, $F_4$, $F_5$, $F_6$, $F_7$, $F_8$, $F_9$, $F_{10}$, $F_{11}$, $F_{12}$ from a facial image into the at least one processor using a vector $$F=(F_1, \ldots, F_{12})^t$$

where t represents the transpose, $F_1$ represents the horizontal coordinate of the left eye outer corner, $F_2$ represents the vertical coordinate of the left eye outer corner, $F_3$ represents the horizontal coordinate of the left eye inner corner, $F_4$ represents the vertical coordinate of the left eye inner corner, $F_5$ represents the horizontal coordinate of the right eye outer corner, $F_6$ represents the vertical coordinate of the right eye outer corner, $F_7$ represents the horizontal coordinate of the right eye inner corner, $F_8$ represents the vertical coordinate of the right eye inner corner, $F_9$ represents the horizontal coordinate of the left mouth corner, $F_{10}$ represents the vertical coordinate of the left mouth corner, $F_{11}$ represents the horizontal coordinate of the right mouth corner, and $F_{12}$ represents the vertical coordinate of the right mouth corner;

the at least one processor configured to convert the first coordinates $F_1$, $F_2$, $F_3$, $F_4$, $F_5$, $F_6$, $F_7$, $F_8$, $F_9$, $F_{10}$, $F_{11}$, $F_{12}$ into second coordinates for the corners of the eye and mouth in a virtual vertical plane comprising $P_1=(-x_{e1},y_{e1},0)$, $P_2=(-x_{e2},y_{e2},0)$, $P_3=(x_{e1},y_{e1},0)$, $P_4=(x_{e2},y_{e2},0)$, $P_5=(-x_m,y_m,0)$, and $P_6=(x_m,y_m,0)$, where $P_1$ is the estimated left eye outer corner coordinates, $P_2$ is, the estimated left eye inner corner coordinates, $P_3$ is the estimated right eye outer corner coordinates, $P_4$ is the estimated right eye inner corner coordinates, $P_5$ is the estimated left mouth corner coordinates and $P_6$ is the estimated right mouth corner coordinates; and wherein x and y represent horizontal and vertical distances from a facial reference point, $x_{e1}$ and $-x_{e1}$ represent the horizontal coordinates of the outer corners of the eyes, $x_{e2}$ and $-x_{e2}$ represent the horizontal coordinates of the inner corners of the eyes, $y_{e1}$ and $y_{e2}$ represent the vertical coordinates of the outer and inner corners of the eyes, $x_m$ and $-x_m$ represent the horizontal coordinates of the corners of the mouth, $y_m$ represent the vertical coordinates of the corners of the mouth in the virtual vertical plane;

the at least one processor being configured to solve for the parameter vector $V_p$ using the equation $V_p=(x_{e1},y_{e1},x_{e2},y_{e2},x_m,y_m,\theta,\varphi,\psi,\alpha)^t$ wherein the parameter vector $V_p$ comprises 10 parameters $x_{e1}$, $y_{e1}$, $x_{e2}$, $y_{e2}$, $x_m$, $y_m$, $\theta$, $\varphi$, $\psi$, $\alpha$ and wherein $\theta$ represents the yaw, $\varphi$ represents the pitch, $\psi$ represents the roll and $\alpha$ represents the scale in the following equation:

$$V_p=(x_{e1},y_{e1},x_{e2},y_{e2},x_m,y_m,\theta,\varphi,\psi,\alpha)^t$$

where $x_{e1}$, $y_{e1}$, $x_{e2}$, $y_{e2}$, $x_m$, $y_m$, represent the virtual plane coordinates of the corners of the eyes and mouth in the vertical virtual plane, and wherein the error to be minimized is the error between the inputted corners of the eyes and mouth coordinates $F_1$, $F_2$, $F_3$, $F_4$, $F_5$, $F_6$, $F_7$, $F_8$, $F_9$, $F_{10}$, $F_{11}$, $F_{12}$ and the least square estimation model function $f(V_p)$ coordinates of the estimated inputted corners of the eyes and mouth coordinate values comprising horizontal coordinates $f_1(V_p)$, $f_3(V_p)$, $f_5(V_p)$, $f_7(V_p)$, $f_9(V_p)$, $f_{11}(V_p)$, and vertical coordinates $f_2(V_p)$, $f_4(V_p)$, $f_6(V_p)$, $f_8(V_p)$, $f_{10}(V_p)$, $f_{12}(V_P)$ and where the least square model function $f(V_p)$ is computed using $f_1(V_p)=\alpha[1,0,0]T\ P_1$
$f_2(V_p)=\alpha[0,1,0]T\ P_1$
$f_3(V_p)=\alpha[1,0,0]T\ P_2$
$f_4(V_p)=\alpha[0,1,0]T\ P_2$
$f_5(V_p)=\alpha[1,0,0]T\ P_3$
$f_6(V_p)=\alpha[0,1,0]T\ P_3$
$f_7(V_p)=\alpha[1,0,0]T\ P_4$
$f_8(V_p)=\alpha[0,1,0]T\ P_4$
$f_9(V_p)=\alpha[1,0,0]T\ P_5$
$f_{10}(V_p)=\alpha[0,1,0]T\ P_5$
$f_{11}(V_p)=\alpha[1,0,0]T\ P_6$
$f_{12}(V_p)=\alpha[0,1,0]T\ P_6$ where T correlates to the head orientation $\theta$, $\varphi$, $\psi$ and the matrix $T=T_\theta \cdot T_\varphi \cdot T_\psi$ where $$T_\theta = \begin{bmatrix} \cos\theta & \sin\theta & 0 \\ -\sin\theta & \cos\theta & 0 \\ 0 & 0 & 1 \end{bmatrix}$$

$$T_\phi = \begin{bmatrix} \cos\phi & 0 & \sin\theta \\ 0 & 1 & 0 \\ -\sin\phi & 0 & \cos\phi \end{bmatrix}$$

$$T_\psi = \begin{bmatrix} 1 & 0 & 0 \\ 0 & \cos\psi & \sin\psi \\ 0 & -\sin\psi & \cos\psi \end{bmatrix},$$

whereby the common plane coordinates $P_1$ through $P_6$ are used to find a match in a database of a plurality of images of people represented by facial coordinates in a plane common to other images in order to identify or recognize an individual.

10. A system for facial recognition in which facial image representations stored in a database are defined by facial coordinates in a plane common to other images in the database:

at least one processor configured to compare the likeness of the facial images by comparing the common plane facial coordinates, the common plane being determined by the locations of the eyes and mouth corners;

at least one input operatively connected to the at least one processor and configured to input the corners of the eyes and mouth coordinates from a facial image into the at least one processor;

the at least one processor configured to convert the inputted coordinates for the corners of the eyes and mouth into estimated coordinates in a common plane by minimizing the error between the inputted corners of the eyes and mouth coordinates and the estimated coordinates corners of the eyes and mouth obtained from an estimation of the common plane coordinates of the corners of eyes and mouth; the at least one processor configured to perform facial recognition to determine identification of a subject by comparing the common plane facial coordinates of an inputted facial image.

11. The system of claim 10 wherein inputted first corners of the eyes and mouth coordinates $F_1$, $F_2$, $F_3$, $F_4$, $F_5$, $F_6$, $F_7$, $F_8$, $F_9$, $F_{10}$, $F_{11}$, $F_{12}$ are determined from a facial image inputted into the at least one processor using a vector $$F=(F_1, \ldots, F_{12})^t$$

where t represents the transpose, $F_1$ represents the horizontal coordinate of the left eye outer corner, $F_2$ represents the vertical coordinate of the left eye outer corner, $F_3$ represents the horizontal coordinate of the left eye inner corner, $F_4$ represents the vertical coordinate of the left eye inner corner, $F_5$ represents the horizontal coordinate of the right eye outer corner, $F_6$ represents the vertical coordinate of the right eye outer corner, $F_7$ represents the horizontal coordinate of the right eye inner corner, $F_8$ represents the vertical coordinate of the right eye inner corner, $F_9$ represents the horizontal coordinate of the left mouth corner, $F_{10}$ represents the vertical coordinate of the left mouth corner, $F_{11}$ represents the horizontal coordinate of the right mouth corner, and $F_{12}$ represents the vertical coordinate of the right mouth corner;

and wherein the coordinates in the common plane for the corners of the eye and mouth comprise $P_1=(-x_{e1},y_{e1},0)$, $P_2=(-x_{e2},y_{e2},0)$, $P_3=(x_{e1},y_{e1},0)$, $P_4=(x_{e2},y_{e2},0)$, $P_5=(-x_m,y_m,0)$, and $P_6=(x_m,y_m,0)$, where $P_1$ is the estimated left eye outer corner coordinates, $P_2$ is, the estimated left eye inner corner coordinates, $P_3$ is the estimated right eye outer corner coordinates, $P_4$ is the estimated right eye inner corner coordinates, $P_5$ is the estimated left mouth corner coordinates and $P_6$ is the estimated right mouth corner coordinates; and wherein x and y represent horizontal and vertical distances from a facial reference point, $x_{e1}$ and $-x_{e1}$ represent the horizontal coordinates of the outer corners of the eyes, $x_{e2}$ and $-x_{e2}$ represent the horizontal coordinates of the inner corners of the eyes, $y_{e1}$ and $y_{e2}$ represent the vertical coordinates of the outer and inner corners of the eyes, $x_m$ and $-x_m$ represent the horizontal coordinates of the corners of the mouth, $y_m$ represent the vertical coordinates of the corners of the mouth in the virtual vertical plane;

and wherein the at least one processor converts the first coordinates $F_1$, $F_2$, $F_3$, $F_4$, $F_5$, $F_6$, $F_7$, $F_8$, $F_9$, $F_{10}$, $F_{11}$, $F_{12}$ into second coordinates for the corners of the eye and mouth in a common vertical plane by solving for the parameter vector $V_p$ using the equation $V_p=(x_{e1},y_{e1},x_{e2},y_{e2},x_m,y_m,\theta,\varphi,\psi)^t$ wherein the parameter vector $V_p$ comprises 9 parameters $x_{e1}$, $y_{e1}$, $x_{e2}$, $y_{e2}$, $x_m$, $y_m$, $\theta$, $\varphi$, $\psi$ and wherein $\theta$ represents the yaw, $\varphi$ represents the pitch, and $\psi$ represents the roll of the facial image relative to the virtual vertical plane, and wherein the error to be minimized is the error between the inputted corners of the eyes and mouth coordinates $F_1$, $F_2$, $F_3$, $F_4$, $F_5$, $F_6$, $F_7$, $F_8$, $F_9$, $F_{10}$, $F_{11}$, $F_{12}$ and the least square estimation model function $f(V_p)$ coordinates of the estimated inputted corners of the eyes and mouth coordinate values comprising horizontal coordinates $f_1(V_p)$, $f_3(V_p)$, $f_5(V_p)$, $f_7(V_p)$, $f_9(V_p)$, $f_{11}(V_p)$, and vertical coordinates $f_2(V_p)$, $f_4(V_p)$, $f_6(V_p)$, $f_8(V_p)$, $f_{10}(V_p)$, $f_{12}(V_p)$ and where the least square model function $f(V_p)$ is computed using $f_1(V_p)=[1,0,0]T\ P_1$
$f_2(V_p)=[0,1,0]T\ P_1$
$f_3(V_p)=[1,0,0]T\ P_2$
$f_4(V_p)=[0,1,0]T\ P_2$
$f_5(V_p)=[1,0,0]T\ P_3$
$f_6 V_p)=[0,1,0]T\ P_3$
$f_7(V_p)=[1,0,0]T\ P_4$
$f_8(V_p)=[0,1,0]T\ P_4$
$f_9(V_p)=[1,0,0]T\ P_5$
$f_{10}(V_p)=[0,1,0]T\ P_5$
$f_{11}(V_p)=[1,0,0]T\ P_6$
$f_{12}(V_p)=[0,1,0]T\ P_6$ where T correlates to the head orientation comprising yaw, pitch and roll $(\theta,\varphi,\psi)$ and is a matrix $T=T_\theta \cdot T_\varphi \cdot T_\psi$ where $$T_\theta = \begin{bmatrix} \cos\theta & \sin\theta & 0 \\ -\sin\theta & \cos\theta & 0 \\ 0 & 0 & 1 \end{bmatrix}$$

$$T_\phi = \begin{bmatrix} \cos\phi & 0 & \sin\theta \\ 0 & 1 & 0 \\ -\sin\phi & 0 & \cos\phi \end{bmatrix}$$

$$T_\psi = \begin{bmatrix} 1 & 0 & 0 \\ 0 & \cos\psi & \sin\psi \\ 0 & -\sin\psi & \cos\psi \end{bmatrix},$$

whereby the common plane coordinates $P_1$ through $P_6$ in a database of a plurality of images of people are used to match a requested individual's facial image represented by facial coordinates in a plane common to other images in the database in order to identify or recognize the individual.

12. The system of claim 10 wherein the at least one processor defines common plane facial coordinates correlating to the virtual locations of the inputted facial feature coordinates located in a virtual vertical plane wherein the yaw, pitch and roll are zero.

13. The system of claim 10 wherein the at least one processor is configured to perform facial recognition by comparing the location of the coordinates of the corners of the eyes and mouth coordinates of a subject to the locations of the corners of the eyes and mouth coordinates of the images of people in the database.

14. The system of claim 10 wherein processor is configured to convert the inputted coordinates for the corners of the eyes and mouth into estimated coordinates in a common plane by minimizing the error between the inputted corners of the eyes and mouth coordinates and the estimated coordinates corners of the eyes and mouth using a least square estimation of the common plane coordinates of the corners of eyes and mouth.

15. The system of claim 14 wherein the least square estimation of the common plane coordinates of the corners of eyes and mouth is computed using a non-linear Gaussian Least Square Differential Correction algorithm.

16. The system of claim 15 wherein the Gaussian Least Square Differential Correction algorithm comprises a least square model function $f(V_p)$ that is computed using $f_1(V_p)=\alpha[1,0,0]T\ P_1$
$f_2(V_p)=\alpha[0,1,0]T\ P_1$
$f_3(V_p)=\alpha[1,0,0]T\ P_2$
$f_4(V_p)=\alpha[0,1,0]T\ P_2$
$f_5(V_p)=\alpha[1,0,0]T\ P_3$
$f_6 V_p)=\alpha[0,1,0]T\ P_3$
$f_7(V_p)=\alpha[1,0,0]T\ P_4$
$f_8(V_p)=\alpha[0,1,0]T\ P_4$
$f_9(V_p)=\alpha[1,0,0]T\ P_5$
$f_{10}(V_p)=\alpha[0,1,0]T\ P_5$
$f_{11}(V_p)=\alpha[1,0,0]T\ P_6$
$f_{12}(V_p)=\alpha[0,1,0]T\ P_6$ where T correlates to the head orientation $\theta$, $\varphi$, $\psi$ and the matrix $T=T_\theta \cdot T_\varphi \cdot T_\psi$ where $$T_\theta = \begin{bmatrix} \cos\theta & \sin\theta & 0 \\ -\sin\theta & \cos\theta & 0 \\ 0 & 0 & 1 \end{bmatrix}$$

-continued $$T_\phi = \begin{bmatrix} \cos\phi & 0 & \sin\theta \\ 0 & 1 & 0 \\ -\sin\phi & 0 & \cos\phi \end{bmatrix}$$

$$T_\psi = \begin{bmatrix} 1 & 0 & 0 \\ 0 & \cos\psi & \sin\psi \\ 0 & -\sin\psi & \cos\psi \end{bmatrix},$$

whereby the common plane coordinates $P_1$ through $P_6$ are used to find a match in a database of a plurality of images of people represented by facial coordinates in a plane common to other images in order to identify or recognize a subject.

17. The system of claim 10 wherein the facial image representations stored in the database comprise one of facial images of suspected individuals, persons convicted of crimes, driver's license images of general public, criminals for criminal detection, persons for airline screening, persons for access control, persons for a surveillance system, persons for identification of dead bodies, and terrorists on a watch list.

* * * * *